(12) United States Patent
Song et al.

(10) Patent No.: US 10,809,086 B2
(45) Date of Patent: Oct. 20, 2020

(54) NAVIGATION SYSTEM, APPARATUS, AND METHOD

(71) Applicant: HUAWEI TECHNOLOGIES CO., LTD., Shenzhen (CN)

(72) Inventors: Yonggang Song, Beijing (CN); Hui Li, Shenzhen (CN); Zhihua Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 15/952,394

(22) Filed: Apr. 13, 2018

(65) Prior Publication Data
US 2018/0245938 A1    Aug. 30, 2018

Related U.S. Application Data

(63) Continuation of application No. PCT/CN2015/091997, filed on Oct. 15, 2015.

(51) Int. Cl.
*G01C 21/34* (2006.01)
*G08G 1/0968* (2006.01)
*G01C 21/36* (2006.01)

(52) U.S. Cl.
CPC ..... *G01C 21/3492* (2013.01); *G01C 21/3407* (2013.01); *G01C 21/3658* (2013.01); *G01C 21/3691* (2013.01); *G08G 1/096822* (2013.01)

(58) Field of Classification Search
CPC ............ G01C 21/3492; G01C 21/3407; G01C 21/3658; G01C 21/3691; G08G 1/096822
USPC .......................................................... 701/423
See application file for complete search history.

(56) References Cited

U.S. PATENT DOCUMENTS

| | | | | |
|---|---|---|---|---|
| 5,220,507 A | * | 6/1993 | Kirson | G01C 21/34 340/995.19 |
| 2008/0033625 A1 | * | 2/2008 | Ohtsuji | B60W 30/16 701/93 |
| 2010/0021012 A1 | * | 1/2010 | Seegers | G01C 21/206 382/113 |

(Continued)

FOREIGN PATENT DOCUMENTS

| CN | 102005129 A | 4/2011 |
|---|---|---|
| CN | 102903258 A | 1/2013 |

(Continued)

*Primary Examiner* — Muhammad Shafi
(74) *Attorney, Agent, or Firm* — Kilpatrick Townsend & Stockton LLP

(57) ABSTRACT

The present invention provides a navigation system, apparatus, and method. The navigation system includes a global navigation apparatus, a first roadside navigation apparatus, and a terminal navigation apparatus. The terminal navigation apparatus is configured to send, to the global navigation apparatus, a global path request used to request for a road-level global path. The global navigation apparatus is configured to: determine the global path according to the global path request, and send, to the terminal navigation apparatus, first indication information used to indicate the global path. The first roadside navigation apparatus is configured to: determine a lane-level local path according to the global path, and send, to the terminal navigation apparatus, second indication information used to indicate the local path.

22 Claims, 11 Drawing Sheets

(56) References Cited

U.S. PATENT DOCUMENTS

| | | | |
|---|---|---|---|
| 2010/0114475 A1* | 5/2010 | Shin | G01C 21/30 |
| | | | 701/533 |
| 2010/0157430 A1* | 6/2010 | Hotta | G02B 27/01 |
| | | | 359/630 |
| 2010/0274429 A1 | 10/2010 | Yoo et al. | |
| 2011/0125344 A1 | 5/2011 | An et al. | |
| 2012/0259541 A1 | 10/2012 | Downey et al. | |
| 2013/0169668 A1* | 7/2013 | Lynch | G01S 17/89 |
| | | | 345/619 |
| 2013/0325330 A1* | 12/2013 | Chen | G01C 21/32 |
| | | | 701/450 |
| 2013/0332044 A1* | 12/2013 | Um | B60K 31/0066 |
| | | | 701/93 |
| 2014/0046584 A1* | 2/2014 | Aben | G01C 21/3492 |
| | | | 701/428 |
| 2014/0337781 A1* | 11/2014 | Bastide | G06F 3/0484 |
| | | | 715/771 |
| 2015/0253778 A1 | 9/2015 | Rothoff et al. | |

FOREIGN PATENT DOCUMENTS

| | | | |
|---|---|---|---|
| CN | 103206956 A | * | 7/2013 |
| CN | 103206956 A | | 7/2013 |
| CN | 103245342 A | | 8/2013 |
| CN | 104880193 A | | 9/2015 |
| JP | H11351891 A | | 12/1999 |
| JP | 2002190094 A | | 7/2002 |
| JP | 2008228051 A | | 9/2008 |
| JP | 2011060019 A | | 3/2011 |

\* cited by examiner

ND METHOD

CROSS-REFERENCE TO RELATED APPLICATIONS

This application is a continuation of International Application No. PCT/CN2015/091997, filed on Oct. 15, 2015. The disclosures of the aforementioned applications are hereby incorporated by reference in their entireties.

TECHNICAL FIELD

The present invention relates to the communications field, and more specifically, to a navigation system, apparatus, and method.

BACKGROUND

Currently, terminal navigators have been widely applied. However, currently, there are mainly human-oriented navigation applications, and positioning and navigation performed by using the navigation applications are mostly developed based on a global positioning system (GPS). A basic principle is as follows: A path is planned according to a start location and a destination with reference to a locally stored electronic map, and real-time path prompt and guide are provided to a driver by means of vision and a voice according to GPS positioning in a driving process. In such a navigation manner, a terminal navigator needs to have a capability of planning and calculating a path, and consequently, relatively high terminal costs are caused. In addition, it is inconvenient to update the map, and dynamic road condition information cannot be associated with path planning.

As vehicles become increasingly more intelligent, and a self-driving technology develops rapidly in recent years, previous human-oriented navigators that are based on only a vehicle terminal cannot meet a requirement, and a vehicle-oriented central navigation system is an inevitable development trend of intelligent transportation. The central navigation system includes a navigation center server and multiple vehicle terminals. An advantage of the central navigation system lies in that the vehicle terminal may obtain, in real time by using a network, a related information service and map apparatus data that are provided by a navigation center. An existing central navigation-based path guide method is as follows: After the navigation center server delivers a planned path to the vehicle terminal, it is determined, according to current location information uploaded by the vehicle terminal, whether a road condition of a road that has not been reached by the terminal changes. If the road condition changes, a path is replanned according to the current location information of the vehicle terminal, road condition information, and destination information, and the replanned path is delivered to the vehicle terminal. The vehicle terminal may navigate a vehicle according to the replanned path, so that the vehicle terminal can update a planned path in real time, to relieve traffic congestion.

However, an existing navigation architecture is inapplicable to a scale self-driving scenario.

SUMMARY

Embodiments of the present invention provide a navigation system, apparatus, and method that can improve precision of path planning performed by a navigation system, and are applicable to a scale self-driving scenario.

A first aspect provides a navigation system, and the navigation system includes a global navigation apparatus, a first roadside navigation apparatus, and a terminal navigation apparatus. The terminal navigation apparatus is configured to send a global path request to the global navigation apparatus, where the global path request is used to request to determine a global path from a start location to a destination. The global navigation apparatus is configured to: receive the global path request sent by the terminal navigation apparatus, determine a road-level global path from the start location to the destination according to the global path request, and send first indication information to the terminal navigation apparatus, where the first indication information is used to indicate the global path. The first roadside navigation apparatus is configured to: determine, according to the global path, a lane-level local path corresponding to at least a part of the global path, and send, to the terminal navigation apparatus, second indication information used to indicate the local path. The terminal navigation apparatus is further configured to: receive the first indication information sent by the global navigation apparatus and the second indication information sent by the first roadside navigation apparatus, and determine a first travelling path according to at least one of the global path indicated by the first indication information or the local path indicated by the second indication information The navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, lane-level path planning and navigation are implemented, navigation precision is improved, and burden on the global navigation apparatus is not increased.

With reference to the first aspect, in a possible implementation of the first aspect, the global navigation apparatus is specifically configured to: receive the global path request sent by the terminal navigation apparatus; determine the global path according to the start location, the destination, and additional information, where the additional information includes at least one of the following information: current road condition information, global path policy information, vehicle type information of a vehicle corresponding to the terminal navigation apparatus, or driving type information of the vehicle, and the driving type information is used to indicate whether a driving type of the vehicle is manned driving or unmanned driving; and send the first indication information to the terminal navigation apparatus, where the first indication information is used to indicate the global path.

With reference to the first aspect, in a possible implementation of the first aspect, the first roadside navigation apparatus is further configured to: receive the global path request sent by the terminal navigation apparatus, and forward the global path request to the global navigation apparatus; the global navigation apparatus is specifically configured to: receive the global path request forwarded by the first roadside navigation apparatus, and send the first indication information to the first roadside navigation apparatus according to the global path request; the first roadside navigation apparatus is further configured to: receive the first indication information sent by the global navigation apparatus, and forward the first indication information to the terminal navigation apparatus; and the terminal navigation apparatus is specifically configured to receive the first indication information forwarded by the first roadside navigation apparatus.

With reference to the first aspect, in a possible implementation of the first aspect, the first roadside navigation apparatus is further configured to: before determining, according to the global path, the lane-level local path corresponding to the at least a part of the global path, receive a local path request sent by the terminal navigation apparatus, where the local path request carries information about the global path; and the first roadside navigation apparatus is specifically configured to determine the local path according to the local path request.

With reference to the first aspect, in a possible implementation of the first aspect, the navigation system further includes a second roadside navigation apparatus. The first roadside navigation apparatus is further configured to: before determining, according to the global path, the lane-level local path corresponding to the at least a part of the global path, receive a first travelling-in notification message sent by the second roadside navigation apparatus, where the first travelling-in notification message is used to indicate that the terminal navigation apparatus is about to enter a coverage area of the first roadside navigation apparatus, and the first travelling-in notification message carries information about the global path; and the first roadside navigation apparatus is specifically configured to determine the local path according to the first travelling-in notification message.

With reference to the first aspect, in a possible implementation of the first aspect, the first roadside navigation apparatus is specifically configured to determine the local path according to the global path and a local path policy, and the local path policy includes at least one of lane load balancing, frequent lane change avoidance, throughput first, or speed first.

With reference to the first aspect, in ah possible implementation of the first aspect, the system further includes a third roadside navigation apparatus. The first roadside navigation apparatus is further configured to: send a second travelling-in notification message to the third roadside navigation apparatus, where the second travelling-in notification message is used to indicate that the terminal navigation apparatus is about to travel into a coverage area of the third roadside navigation apparatus; and receive a travelling-in acknowledgement message sent by the third roadside navigation apparatus, where the travelling-in acknowledgement message is used to indicate that the terminal navigation apparatus has travelled into the coverage area of the third roadside navigation apparatus.

With reference to the first aspect, in a possible implementation of the first aspect, the terminal navigation apparatus is further configured to: send a terminal registration request to the global navigation apparatus, where the terminal registration request is used to request the global navigation apparatus to authenticate the terminal navigation apparatus; and receive a terminal registration acknowledgement that is sent by the global navigation apparatus according to the terminal registration request.

The navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, lane-level path planning and navigation in an entire journey are implemented, navigation precision is improved, the navigation system can be applicable to a large-scale self-driving scenario, and burden on the global navigation apparatus is not increased. The global navigation apparatus distributes massive lane-level path navigation services to multiple roadside navigation apparatuses, and a failure of a single roadside navigation apparatus does not cause breakdown of the entire system, so that system reliability is improved.

A second aspect provides a roadside navigation apparatus, and the roadside navigation apparatus includes: a first determining module, configured to determine a road-level global path from a start location to a destination; a second determining module, configured to determine, according to the global path determined by the first determining module, a lane-level local path corresponding to at least a part of the global path; and a first sending module, configured to send second indication information to a terminal navigation apparatus, where the second indication information is used to indicate the local path determined by the second determining module.

With reference to the second aspect, in a possible implementation of the second aspect, the first determining module is specifically configured to: receive first indication information sent by a global navigation apparatus, where the first indication information is used to indicate the global path; and determine the global path according to the first indication information.

With reference to the second aspect, in a possible implementation of the second aspect, the first determining module is specifically configured to: receive a first travelling-in notification message sent by a second roadside navigation apparatus, where the first travelling-in notification message is used to indicate that the terminal navigation apparatus is about to enter a coverage area of the first roadside navigation apparatus, and the first travelling-in notification message carries information about the global path; and determine the global path according to the first travelling-in notification message.

With reference to the second aspect, in a possible implementation of the second aspect, the first determining module is specifically configured to: receive a local path request sent by the terminal navigation apparatus, where the local path request carries information about the global path; and determine the local path according to the local path request.

With reference to the second aspect, in a possible implementation of the second aspect, the second determining module is specifically configured to determine the local path according to the global path and a local path policy, where the local path policy includes at least one of lane load balancing, frequent lane change avoidance, throughput first, or speed first.

With reference to the second aspect, in a possible implementation of the second aspect, the roadside navigation apparatus further includes: a second sending module, configured to send a second travelling-in notification message to a third roadside navigation apparatus, where the second travelling-in notification message is used to indicate that the terminal navigation apparatus is about to travel into a coverage area of the third roadside navigation apparatus; and a first receiving module, configured to receive a travelling-in acknowledgement message that is sent by the third roadside navigation apparatus according to the second travelling-in notification message, where the travelling-in acknowledgement message is used to indicate that the terminal navigation apparatus has travelled into the coverage area of the third roadside navigation apparatus.

According to the roadside navigation apparatus in this embodiment of the present invention, a road-level global path from a start location to a destination is determined, a lane-level local path corresponding to at least a part of the global path is determined according to the global path, and second indication information used to indicate the local path is sent to the terminal navigation apparatus. Therefore, lane-level path planning and navigation in an entire journey are implemented, navigation precision is improved, the roadside navigation apparatus can be applicable to a large-scale self-driving scenario, and burden on a global navigation apparatus is not increased. The global navigation apparatus distributes massive lane-level path navigation services to multiple roadside navigation apparatuses, and a failure of a single roadside navigation apparatus does not cause breakdown of an entire system, so that system reliability is improved.

A third aspect provides a terminal navigation apparatus, and the terminal navigation apparatus includes: a first sending module, configured to send a global path request to a global navigation apparatus, where the global path request is used to request to determine a global path from a start location to a destination; a first receiving module, configured to receive first indication information that is sent by the global navigation apparatus according to the global path request sent by the first sending module, where the first indication information is used to indicate a road-level global path from the start location to the destination; a second receiving module, configured to receive second indication information sent by a first roadside navigation apparatus, where the second indication information is used to indicate a lane-level local path corresponding to at least a part of the global path; and a determining module, configured to determine a first travelling path according to at least one of the global path indicated by the first indication information received by the first receiving module or the local path indicated by the second indication information received by the second receiving module.

With reference to the third aspect, in a possible implementation of the third aspect, the first sending module is specifically configured to send the global path request to the first roadside navigation apparatus, so that the first roadside navigation apparatus forwards the global path request to the global navigation apparatus; and the first receiving module is specifically configured to receive the first indication information forwarded by the first roadside navigation apparatus, where the first indication information is sent by the global navigation apparatus to the first roadside navigation apparatus according to the global path request.

With reference to the third aspect, in a possible implementation of the third aspect, the global path request carries additional information, the additional information includes at least one of the following information: current road condition information, global path policy information, vehicle type information of a vehicle corresponding to the terminal navigation apparatus, or driving type information of the vehicle, and the driving type information is used to indicate whether a driving type of the vehicle is manned driving or unmanned driving.

With reference to the third aspect, in a possible implementation of the third aspect, the apparatus further includes a second sending module, and the second sending module is configured to send a local path request to the first roadside navigation apparatus before the second receiving module receives the second indication information sent by the first roadside navigation apparatus, where the local path request is used to request to determine the local path corresponding to the global path; and the second receiving module is specifically configured to receive the second indication information that is sent by the first roadside navigation apparatus according to the local plan request.

With reference to the third aspect, in a possible implementation of the third aspect, the terminal navigation apparatus further includes: a third sending module, configured to send a terminal registration request to the global navigation apparatus before the first sending module sends the global path request to the global navigation apparatus, where the terminal registration request is used to request the global navigation apparatus to authenticate the terminal navigation apparatus; and a third receiving module, configured to receive a terminal registration acknowledgement that is sent by the global navigation apparatus according to the terminal registration request.

According to the terminal navigation apparatus in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, lane-level path planning and navigation are implemented, navigation precision is improved, the terminal navigation apparatus can be applicable to a large-scale self-driving scenario, and burden on the global navigation apparatus is not increased. The global navigation apparatus distributes massive lane-level path navigation services to multiple roadside navigation apparatuses, and a failure of a single roadside navigation apparatus does not cause breakdown of an entire system, so that system reliability is improved.

A fourth aspect provides a global navigation apparatus, and the global navigation apparatus includes: a first receiving module, configured to receive a global path request sent by a terminal navigation apparatus, where the global path request is used to request to determine a global path from a start location to a destination; a determining module, configured to determine a road-level global path from the start location to the destination according to the global path request received by the first receiving module; and a first sending module, configured to send first indication information to a first roadside navigation apparatus corresponding to the terminal navigation apparatus, where the first indication information is used to indicate the global path determined by the determining module, so that the first roadside navigation apparatus determines, according to the first indication information, a lane-level local path corresponding to at least a part of the global path.

With reference to the fourth aspect, in a possible implementation of the fourth aspect, the first receiving module is specifically configured to receive the global path request forwarded by the first roadside navigation apparatus, where the global path request forwarded by the first roadside navigation apparatus is sent by the terminal navigation apparatus.

With reference to the fourth aspect, in a possible implementation of the fourth aspect, the determining module is specifically configured to: determine the road-level global path from the start location to the destination according to the start location, the destination, and additional information, where the additional information includes at least one of the following information: current road condition information, global path policy information, vehicle type information of a vehicle corresponding to the terminal navigation apparatus, or driving type information of the vehicle, and the driving type information is used to indicate whether a driving type of the vehicle is manned driving or unmanned driving.

With reference to the fourth aspect, in a possible implementation of the fourth aspect, the global navigation apparatus further includes: a second receiving module, configured to receive a terminal registration request sent by the terminal navigation apparatus, where the terminal registration request is used to request the global navigation apparatus to authenticate the terminal navigation apparatus; and a second sending module, configured to send a terminal registration acknowledgement message to the terminal navigation apparatus according to the terminal registration request.

According to the global navigation apparatus in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, lane-level path planning and navigation in an entire journey are implemented, navigation precision is improved, the global navigation apparatus can be applicable to a large-scale self-driving scenario, and burden on the global navigation apparatus is not increased. The global navigation apparatus distributes massive lane-level path navigation services to multiple roadside navigation apparatuses, and a failure of a single roadside navigation apparatus does not cause breakdown of an entire system, so that system reliability is improved.

A fifth aspect provides a navigation method, and the navigation method includes: determining, by a first roadside navigation apparatus, a road-level global path from a start location to a destination; determining, by the first roadside navigation apparatus according to the global path, a lane-level local path corresponding to at least a part of the global path; and sending, by the first roadside navigation apparatus, second indication information to a terminal navigation apparatus, where the second indication information is used to indicate the local path.

With reference to the fifth aspect, in a possible implementation of the fifth aspect, the determining, by a first roadside navigation apparatus, a road-level global path from a start location to a destination includes: receiving first indication information sent by a global navigation apparatus, where the first indication information is used to indicate the global path; and determining the global path according to the first indication information.

With reference to the fifth aspect, in a possible implementation of the fifth aspect, the determining, by a first roadside navigation apparatus, a road-level global path from a start location to a destination includes: receiving a first travelling-in notification message sent by a second roadside navigation apparatus, where the first travelling-in notification message is used to indicate that the terminal navigation apparatus is about to enter a coverage area of the first roadside navigation apparatus, and the first travelling-in notification message carries information about the global path; and determining the global path according to the first travelling-in notification message.

With reference to the fifth aspect, in a possible implementation of the fifth aspect, the determining, by a first roadside navigation apparatus, a road-level global path from a start location to a destination includes: receiving a local path request sent by the terminal navigation apparatus, where the local path request carries information about the global path; and determining the global path according to the local path request.

With reference to the third possible implementation of the fifth aspect, in a possible implementation of the fifth aspect, the determining, by the first roadside navigation apparatus according to the global path, a lane-level local path corresponding to at least a part of the global path includes: determining the local path according to the global path and a local path policy, where the local path policy includes at least one of lane load balancing, frequent lane change avoidance, throughput first, or speed first.

With reference to the fifth aspect, in a possible implementation of the fifth aspect, the navigation method further includes: sending a second travelling-in notification message to a third roadside navigation apparatus, where the second travelling-in notification message is used to indicate that the terminal navigation apparatus is about to travel into a coverage area of the third roadside navigation apparatus; and receiving a travelling-in acknowledgement message that is sent by the third roadside navigation apparatus according to the second travelling-in notification message, where the travelling-in acknowledgement message is used to indicate that the terminal navigation apparatus has travelled into the coverage area of the third roadside navigation apparatus.

A sixth aspect provides a navigation method, and the navigation method includes: sending a global path request to a global navigation apparatus, where the global path request is used to request to determine a global path from a start location to a destination; receiving first indication information that is sent by the global navigation apparatus according to the global path request, where the first indication information is used to indicate a road-level global path from the start location to the destination; receiving second indication information sent by a first roadside navigation apparatus, where the second indication information is used to indicate a lane-level local path corresponding to at least a part of the global path; and determining a first travelling path according to at least one of the global path indicated by the first indication information or the local path indicated by the second indication information.

With reference to the sixth aspect, in a possible implementation of the sixth aspect, the sending a global path request to a global navigation apparatus includes: sending the global path request to the first roadside navigation apparatus, so that the first roadside navigation apparatus forwards the global path request to the global navigation apparatus; and the receiving first indication information that is sent by the global navigation apparatus according to the global path request includes: receiving the first indication information forwarded by the first roadside navigation apparatus, where the first indication information is sent by the global navigation apparatus to the first roadside navigation apparatus according to the global path request.

With reference to the sixth aspect, in a possible implementation of the sixth aspect, the global path request carries additional information, the additional information includes at least one of the following information: current road condition information, global path policy information, vehicle type information of a vehicle corresponding to the terminal navigation apparatus, or driving type information of the vehicle, and the driving type information is used to indicate whether a driving type of the vehicle is manned driving or unmanned driving.

With reference to the sixth aspect, in a possible implementation of the sixth aspect, before the receiving second indication information sent by a first roadside navigation apparatus, the navigation method further includes: sending a local path request to the first roadside navigation apparatus, where the local path request carries information about the global path; and the receiving second indication information sent by a first roadside navigation apparatus includes: receiving the second indication information that is sent by the first roadside navigation apparatus according to the local plan request.

With reference to the sixth aspect, in a possible implementation of the sixth aspect, before the sending a global path request to a global navigation apparatus, the navigation method further includes: sending a terminal registration request to the global navigation apparatus, where the terminal registration request is used to request the global navigation apparatus to authenticate the terminal navigation apparatus; and receiving a terminal registration acknowledgement that is sent by the global navigation apparatus according to the terminal registration request.

A seventh aspect provides a navigation method, and the navigation method includes: receiving a global path request sent by a terminal navigation apparatus, where the global path request is used to request to determine a global path from a start location to a destination; determining a road-level global path from the start location to the destination according to the global path request; and sending first indication information to a first roadside navigation apparatus corresponding to the terminal navigation apparatus, where the first indication information is used to indicate the global path, so that the first roadside navigation apparatus determines, according to the first indication information, a lane-level local path corresponding to at least a part of the global path.

With reference to the seventh aspect, in a possible implementation of the seventh aspect, the receiving a global path request sent by a terminal navigation apparatus includes: receiving the global path request forwarded by the first roadside navigation apparatus, where the global path request forwarded by the first roadside navigation apparatus is sent by the terminal navigation apparatus.

With reference to the seventh aspect, in a d possible implementation of the seventh aspect, the determining a road-level global path from the start location to the destination according to the global path request includes: determining the road-level global path from the start location to the destination according to the start location, the destination, and additional information, where the addition information includes at least one of the following information: current road condition information, global path policy information, vehicle type information of a vehicle corresponding to the terminal navigation apparatus, or driving type information of the vehicle, and the driving type information is used to indicate whether a driving type of the vehicle is manned driving or unmanned driving.

With reference to the seventh aspect, in a possible implementation of the seventh aspect, before the receiving a global path request sent by a terminal navigation apparatus, the navigation method further includes: receiving a terminal registration request sent by the terminal navigation apparatus, where the terminal registration request is used to request the global navigation apparatus to authenticate the terminal navigation apparatus; and sending a terminal registration acknowledgement to the terminal navigation apparatus according to the terminal registration request.

The navigation system in the embodiments of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, lane-level path planning and navigation are implemented, navigation precision is improved, and burden on the global navigation apparatus is not increased.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
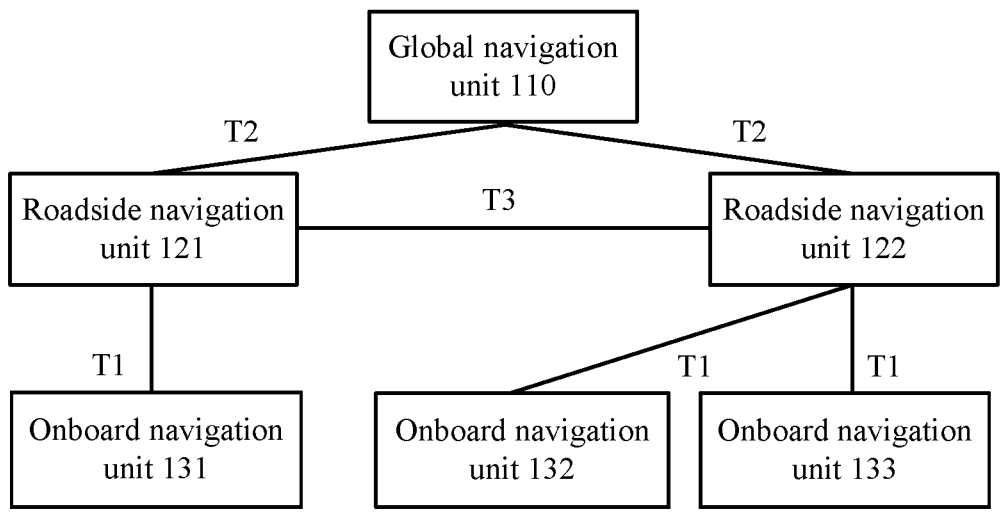
FIG. 1 is an architecture example of a navigation system according to the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A mobile terminal may also be referred to as user equipment, mobile user equipment, or the like, and may communicate with one or more core networks by using a radio access network. The user equipment may be a mobile terminal such as a mobile phone (or referred to as a "cellular" phone) and a computer having a mobile terminal, for example, may be a portable, pocket-sized, handheld, computer-built-in, or vehicle-mounted mobile apparatus that exchanges voice and/or data with the radio access network.

Embodiments of the present invention provide a navigation system. The navigation system includes a global navigation unit (Global Navigation Unit, GNU), N onboard navigation units (Onboard Navigation Unit, ONU), and M roadside navigation units (Roadside Navigation Unit, RNU), where M≥1, and N≥1.

The global navigation unit is responsible for planning, for the onboard navigation unit, a road-level global path from a start location to a destination. Precision of the global path is at a road level. The global path may be a unidirectional travelling route from a start point to an end point. The start point may usually be a current location of a vehicle, and the end point may be specified by a user according to a requirement. A target of determining the global path by the global navigation unit may be to find a shortest path. The "shortest path" herein may mean that the path is the shortest in distance, or that the path takes least time or minimum costs, or the like. This is determined according to different requirements. In addition, when determining the global path, the global navigation unit needs to consider dynamic road condition information of an entire road network, to perform intelligent analysis and comprehensive scheduling. The present invention is not limited thereto.

The roadside navigation unit is responsible for planning, for the onboard navigation unit, a lane-level local path corresponding to at least a part of the global path. Precision of the local path may be at a lane level. The local path may be a detailed travelling route, in a process in which a vehicle travels along the global path, on a relatively short route from a location of the vehicle to a place ahead. A range of the local path is in a coverage area of the roadside navigation unit. Optionally, a target of determining the local path by the roadside navigation unit is to select a proper lane. Specifically, when determining the local path, the roadside navigation unit may consider a lane attribute, a load status of each lane, a destination direction of a vehicle, and the like in the coverage area, to perform local vehicle scheduling and control, so as to balance lane load and improve vehicle traffic efficiency and quality (for example, vehicle speed control or less stop).

The onboard navigation unit may be an onboard navigator, and may be specifically integrated in a vehicle, or may be an independent unit. For example, in a self-driving scenario, the onboard navigation unit needs to be integrated in a vehicle. This is not limited in the present invention.

The onboard navigation unit may determine a travelling path only according to the global path, or determine a travelling path only according to the local path, or determine a travelling path according to the global path and the local path. Optionally, the onboard navigation unit may further have a capability of autonomously planning a path. Autonomous path planning is emergency path adjustment such as emergency obstacle avoidance performed by the onboard navigation unit for a surrounding emergency or a simple decision-making scenario. When autonomously planning a path, the onboard navigation unit may comprehensively consider surrounding information perceived by a vehicle, quickly make a decision, and select an emergency path while ensuring security. An autonomously planned path is a temporary path that is planned by a vehicle without depending on the global navigation unit and the roadside navigation unit. Precision of the autonomously planned path may be at a road level or a lane level, and the present invention is not limited thereto.

In the embodiments of the present invention, the global navigation unit may communicate with each of the M roadside navigation units. Each of the M roadside navigation units may have a coverage area, and may provide a local path service for one or more onboard navigation units in the coverage area of the roadside navigation unit. Optionally, coverage areas of any two of the M roadside navigation units may completely not overlap or may partially overlap. This is not limited in the present invention.

FIG. 1 shows an architecture example of a navigation system according to the present invention. The navigation system includes a global navigation unit 110, a roadside navigation unit 121 and a roadside navigation unit 122 that communicate with the global navigation unit by using an interface T2, an onboard navigation unit 131 that communicates with the roadside navigation unit 121 by using an interface T1, and an onboard navigation unit 132 and an onboard navigation unit 133 that communicate with the roadside navigation unit 122 by using the interface T1. Coverage areas of the roadside navigation unit 121 and the roadside navigation unit 122 are adjacent or partially overlap, and the roadside navigation unit 121 communicates with the roadside navigation unit 122 by using an interface T3.

Optionally, the onboard navigation unit 131, the onboard navigation unit 132, and the onboard navigation unit 133 in the navigation system architecture may be onboard navigators, and may be specifically integrated in a vehicle, or may be independent units. For example, in a self-driving scenario, the onboard navigation units are required to be integrated in a vehicle. This is not limited in the present invention.

It should be understood that, in the navigation system architecture in this embodiment of the present invention, the global navigation unit is responsible for planning, for the onboard navigation unit, a road-level global path from a start location to a destination, and each roadside navigation unit is responsible for planning, for the onboard navigation unit, a lane-level local path corresponding to at least a part of the global path.

Optionally, the navigation system architecture in this embodiment of the present invention may have one roadside navigation unit. In this case, a coverage area of the roadside navigation unit is the same as a coverage area of the global navigation unit, and the roadside navigation unit is responsible for planning lane-level local paths corresponding to all paths of the global path.

Optionally, the navigation system architecture in this embodiment of the present invention may further have another roadside navigation unit and another onboard navigation unit. FIG. 1 shows the roadside navigation unit 121 and the roadside navigation unit 122, and the onboard navigation unit 131, the onboard navigation unit 132, and the onboard navigation unit 133 as examples. However, this embodiment of the present invention is not limited thereto. The coverage areas of the roadside navigation unit 121 and the roadside navigation unit 122 are adjacent or partially overlap, and each roadside navigation unit is responsible for planning a local path corresponding to a part of the global path.

Optionally, main interface messages communicated between the onboard navigation unit and the roadside navigation unit by using the interface T1 may be shown in Table 1:

TABLE 1

| Message name | Direction | Message description |
|---|---|---|
| Vehicle registration/authentication | ONU->RNU | Registration of a vehicle after the vehicle accesses a traffic network needs to be authenticated, and only an authenticated vehicle can obtain a corresponding service. The RNU sends registration authentication information of the vehicle to the GNU, and the GNU completes authentication. (Note: Interaction between the RNU and the GNU belongs to the interface T2.) |
| Vehicle deregistration | ONU->RNU | When a vehicle does not need to be served by a traffic network, the vehicle applies for deregistration. The RNU sends deregistration information of the vehicle to the GNU, and the GNU performs deregistration. (Note: Interaction between the RNU and the GNU belongs to the interface T2.) |
| Vehicle heartbeat | ONU->RNU | The vehicle heartbeat message is periodically sent by the ONU, and content includes a current vehicle location, speed, and direction, a current vehicle health status, and the like. |
| Local path request | ONU->RNU | The ONU applies to a current RNU for local path planning. The RNU returns a local path to the ONU after completing the planning. |
| Active local path change | ONU->RNU | The ONU applies for a local path change. The RNU replans a path, and returns a new local path to the ONU. |
| Passive local path change | ONU<-RNU | The ONU does not need to apply for a local path change, but instead, the RNU replans a local path according to a requirement, and then directly sends the replanned local path to the ONU. |
| Global path request | ONU->RNU | The ONU applies for global path planning, and first sends the message to the RNU. The RNU is not responsible for global path planning. Therefore, the RNU sends application to the GNU, and after obtaining a planned global path from the GNU, the RNU returns the global path to the ONU. In addition, the RNU also stores a copy of the global path according to a requirement. (Note: Interaction between the RNU and the GNU belongs to the interface T2.) |
| Destination selection | ONU<-RNU | When a global path is applied for, a destination specified by a passenger may be corresponding to multiple locations. In this case, the GNU presents optional destinations to the passenger for selection. After receiving the destination selection message sent by the GNU, the RNU forwards the destination selection message to a corresponding ONU. (Note: Interaction between the RNU and the GNU belongs to the interface T2.) |
| Destination acknowledgement | ONU->RNU | After receiving a destination selection message, the ONU sends an acknowledged unique destination to the RNU according to selection of a passenger. The RNU forwards the acknowledgement message to the GNU. (Note: Interaction between the RNU and the GNU belongs to the interface T2.) |
| Active global path change | ONU->RNU | The ONU applies for a global path change, and first sends the message to the RNU. The RNU is not responsible for global path change |

TABLE 1-continued

| Message name | Direction | Message description |
|---|---|---|
| | | planning. Therefore, the RNU sends application to the GNU, and after obtaining a changed global path from the GNU, the RNU returns the changed global path to the ONU. In addition, the RNU also stores a copy of the global path according to a requirement. (Note: Interaction between the RNU and the GNU belongs to the interface T2.) |
| Passive global path change | ONU<-RNU | The ONU does not need to apply for a global path change, but instead, the RNU directly sends a changed global path to the corresponding ONU after receiving a global path change message sent by the GNU. In addition, the RNU also stores a copy of the global path according to a requirement. (Note: Interaction between the RNU and the GNU belongs to the interface T2.) |
| RNU switching notification | ONU<-RNU | When a vehicle travels into a coverage area of an RNU 2 from a coverage area of an RNU 1, the RNU 1 notifies the vehicle that an RNU to which the vehicle belongs is switched from the RNU 1 to the RNU 2. |

Optionally, main interface messages communicated between the roadside navigation unit and the global navigation unit by using the interface T2 may be shown in Table 2:

TABLE 2

| Message name | Direction | Message description |
|---|---|---|
| Vehicle registration/authentication | RNU->GNU | The RNU sends a vehicle registration authentication request to the GNU, and the GNU completes authentication. |
| Vehicle deregistration | RNU->GNU | The RNU sends a terminal deregistration request to the GNU, and deregistration is performed in the GNU. After deregistration is performed in the GNU, the RNU also clears related information of the vehicle. |
| RNU registration | RNU->GNU | The GNU needs to know a status of each RNU and information about each RNU. Therefore, after the RNU is started, the RNU needs to register with the GNU and accept management of the GNU. |
| RNU deregistration | RNU->GNU | When the RNU smoothly exits a service, the RNU sends the deregistration message to the GNU. The GNU marks a status of the RNU or clears information about the RNU according to a deregistration status. |
| Vehicle heartbeat | RNU->GNU | The RNU periodically sends the vehicle heartbeat message to the GNU, and content includes status information of the RNU. For vehicle information in an area administered by the RNU, the RNU may directly send heartbeat information of each vehicle to the GNU, or may collect information (a vehicle location, speed, and direction, a vehicle health status, and the like) of all vehicles and then report the collected information to the RNU. |
| Road condition information | RNU->GNU | The RNU reports real-time road condition information perceived in various manners to the GNU. The RNU perceives many pieces of road condition information, and needs only information that affects an area beyond an area of the RNU. |
| Obtained vehicle information | RNU->GNU | A data center in which the GNU is located maintains detailed information and latest statuses of all vehicles. When the RNU needs detailed information of a vehicle, the RNU applies to the GNU, and the GNU returns a query result to the RNU. |
| Global path request | RNU->GNU | After the RNU receives a global path application message from the ONU, the RNU |

TABLE 2-continued

| Message name | Direction | Message description |
|---|---|---|
| | | sends the global path application message to the GNU. After completing global path planning, the GNU returns a global path to the RNU, and then the RNU returns the global path to the ONU. (Note: Interaction between the RNU and the ONU belongs to the interface T1.) |
| Destination selection | RNU<–GNU | When a global path is applied for, a destination specified by a passenger may be corresponding to multiple locations. In this case, the GNU sends optional destination information to the RNU. After receiving the optional destination information, the RNU forwards the optional destination information to a corresponding ONU. (Note: Interaction between the RNU and the ONU belongs to the interface T1.) |
| Destination acknowledgement | RNU–>GNU | After receiving a destination selection message, the ONU sends an acknowledged unique destination to the RNU according to selection of a passenger. The RNU forwards the acknowledgement message to the GNU. (Note: Interaction between the RNU and the ONU belongs to the interface T1.) |
| Active global path change | RNU–>GNU | After the RNU receives a global path change request from the ONU, the RNU sends application to the GNU. The GNU performs replanning according to a global path change request, and returns a new global path to the RNU after completing the planning. The RNU returns the changed global path to the ONU. In addition, the RNU also stores a copy of the global path according to a requirement. (Note: Interaction between the RNU and the ONU belongs to the interface T1.) |
| Passive global path change | RNU<–GNU | When the GNU needs to change a global path of a vehicle, the GNU performs replanning according to mastered global information, and returns a new global path to the RNU after completing the planning. The RNU returns the changed global path to the ONU. The ONU does not need to apply for this process. In addition, the RNU also stores a copy of the global path according to a requirement. (Note: Interaction between the RNU and the ONU belongs to the interface T1.) |

Optionally, main interface messages communicated, by using the interface T3, between the two roadside navigation units whose coverage areas are adjacent or partially overlap may be shown in Table 3:

TABLE 3

| Message name | Direction | Message description |
|---|---|---|
| Vehicle being about to travel in notification | RNU1–>RNU2 | When a vehicle is about to travel into a coverage area of the RNU 2 from a coverage area of the RNU 1, the RNU 1 sends the notification message to the RNU 2, to notify that the vehicle is about to travel into the RNU 2. The notification message includes basic information and vehicle authentication information of the vehicle, and may also include information such as a lane into which the vehicle travels and a global path of the vehicle. The message may be sent at two occasions: 1. The message is sent when the vehicle is about to travel into a coverage area of the RNU 2 from a coverage area of the RNU 1. Certainly, the message cannot be sent at a moment when an RNU is switched, and a specific advance is required, so as to give the RNU 2 sufficient preparation time. 2. The message is sent when the vehicle enters the RNU 1. In this case, vehicle information needs to be stored in the RNU 2 for a relatively long time. |

TABLE 3-continued

| Message name | Direction | Message description |
|---|---|---|
| Vehicle travelling-in cancellation notification | RNU1->RNU2 | After the RNU 1 has sent a "vehicle being about to travel in notification" message to the RNU 2, if a vehicle does not travel into an area of the RNU 2 any longer due to a reason such as a path change, the RNU 1 sends the notification message to the RNU 2. The RNU 2 clears related information of the vehicle after receiving the message. |
| Vehicle information | RNU1->RNU2 | The RNU 1 sends, to the RNU 2, information about a vehicle that is about to travel into the RNU 2. Content includes a lane used when the vehicle travels into the RNU 2, a global path of the vehicle, and the like. These pieces of information may also be sent in a "vehicle being about to travel in notification" message. Before the vehicle travels into the RNU 2, if these pieces of information need to be changed due to a reason such as a path change, the message may also be used to instruct the RNU 2 to update information. |
| Vehicle travelling-in acknowledgement | RNU1<-RNU2 | After a vehicle has travelled into a coverage area of the RNU 2 from a coverage area of the RNU 1, and has been completely taken over by the RNU 2, the RNU 2 sends, to the RNU 1, a message indicating that the vehicle has been taken over. The RNU 1 clears related information of the vehicle after receiving the message. |

It should be understood that the interface messages in Table 1 to Table 3 are main interface messages between the units in the navigation system, and the present invention is not limited thereto. In practical application, more interface messages may be further obtained by means of extension with reference to a specific requirement, and all the interface messages obtained by means of extension shall fall within the protection scope of the present invention.

Figure 2:
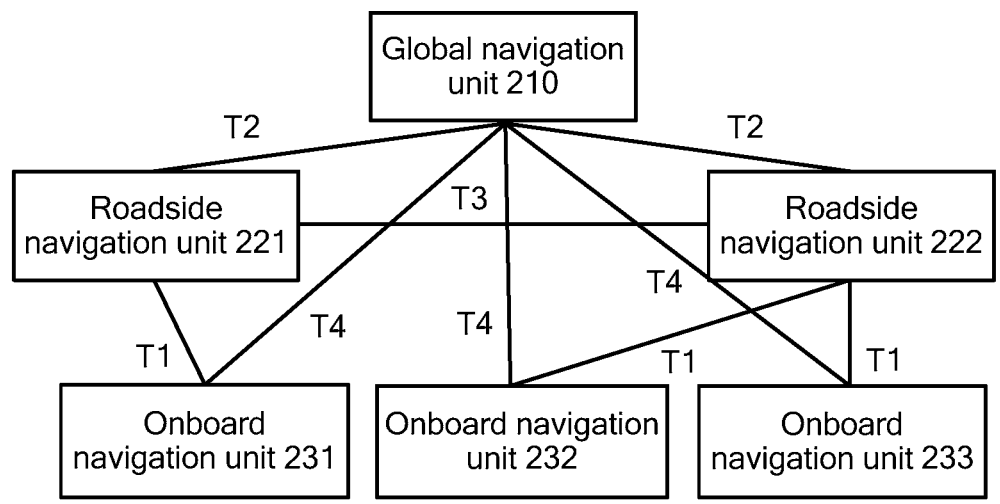
FIG. 2 is another architecture example of a navigation system according to the present invention.

FIG. 2 shows another architecture example of a navigation system according to the present invention. The navigation system includes a global navigation unit 210, a roadside navigation unit 221 and a roadside navigation unit 222 that communicate with the global navigation unit by using an interface T2, an onboard navigation unit 231 that communicates with the roadside navigation unit 221 by using an interface T1, and an onboard navigation unit 232 and an onboard navigation unit 233 that communicate with the roadside navigation unit 222 by using the interface T1. Coverage areas of the roadside navigation unit 221 and the roadside navigation unit 222 are adjacent or partially overlap, and the roadside navigation unit 221 communicates with the roadside navigation unit 222 by using an interface T3.

Optionally, the global navigation unit 210 may further directly communicate with the onboard navigation unit 231, the onboard navigation unit 232, and the onboard navigation unit 233 by using an interface T4.

The onboard navigation unit may be an onboard navigator, and may be specifically integrated in a vehicle, or may be an independent unit. For example, in a self-driving scenario, the onboard navigation unit needs to be integrated in a vehicle. This is not limited in the present invention.

It should be understood that, in the navigation system architecture in this embodiment of the present invention, the global navigation unit is responsible for planning, for the onboard navigation unit, a road-level global path from a start location to a destination, and each roadside navigation unit is responsible for planning, for the onboard navigation unit, a lane-level local path corresponding to at least a part of the global path.

Optionally, the navigation system architecture in this embodiment of the present invention may have one roadside navigation unit. In this case, a coverage area of the roadside navigation unit is the same as a coverage area of the global navigation unit, and the roadside navigation unit is responsible for planning lane-level local paths corresponding to all paths of the global path.

Optionally, the navigation system architecture in this embodiment of the present invention may further have another roadside navigation unit and another onboard navigation unit. FIG. 2 shows the roadside navigation unit 221 and the roadside navigation unit 222, and the onboard navigation unit 231, the onboard navigation unit 232, and the onboard navigation unit 233 as examples. The coverage areas of the roadside navigation unit 221 and the roadside navigation unit 222 are adjacent or partially overlap, and each roadside navigation unit is responsible for planning a local path corresponding to a part of the global path. However, the present invention is not limited thereto.

Optionally, main interface messages communicated between the onboard navigation unit and the roadside navigation unit by using the interface T1 may be shown in Table 4:

TABLE 4

| Message name | Direction | Message description |
|---|---|---|
| Vehicle heartbeat | ONU->RNU | The vehicle heartbeat message is periodically sent by the ONU, and content includes a vehicle location, speed, and direction, a vehicle health status, and the like. |

TABLE 4-continued

| Message name | Direction | Message description |
|---|---|---|
| Local path application | ONU->RNU | The ONU applies to a current RNU for local path planning. The RNU returns a local path to the ONU after completing the planning. |
| Active local path change | ONU->RNU | The ONU applies for a local path change. The RNU replans a path, and returns a new local path to the ONU. |
| Passive local path change | ONU<-RNU | The ONU does not need to apply for a local path change, but instead, the RNU replans a local path according to a requirement, and then directly sends the replanned local path to the ONU. |
| RNU switching notification | ONU<-RNU | When a vehicle travels into an RNU 2 from an RNU1, the RNU 1 notifies the vehicle that an RNU to which the vehicle belongs is switched from the RNU 1 to the RNU 2. |

Optionally, main interface messages communicated between the roadside navigation unit and the global navigation unit by using the interface T2 may be shown in Table 5:

Optionally, main interface messages communicated, by using the interface T3, between the two roadside navigation units whose coverage areas are adjacent or partially overlap may be shown in Table 6:

TABLE 5

| Message name | Direction | Message description |
|---|---|---|
| RNU registration | RNU->GNU | The GNU needs to know a status of each RNU and information about each RNU. Therefore, after the RNU is started, the RNU needs to register with the GNU and accept management of the GNU. |
| RNU deregistration | RNU->GNU | When the RNU smoothly exits a service, the RNU sends the deregistration message to the GNU. The GNU marks a status of the RNU or clears information about the RNU according to a deregistration status. |
| Vehicle heartbeat | RNU->GNU | The RNU periodically sends the vehicle heartbeat message to the GNU, and content includes status information of the RNU. For vehicle information in an area administered by the RNU, the RNU may directly send heartbeat information of each vehicle to the GNU, or may collect information (a vehicle location, speed, and direction, a vehicle health status, and the like) of all vehicles and then report the collected information to the RNU. |
| Road condition information | RNU->GNU | The RNU reports real-time road condition information perceived in various manners to the GNU. The RNU perceives many pieces of road condition information, and needs only information that affects an area beyond an area of the RNU. |
| Vehicle information | RNU->GNU | A data center in which the GNU is located maintains detailed information and latest statuses of all vehicles. When the RNU needs detailed information of a vehicle, the RNU applies to the GNU, and the GNU returns a query result to the RNU. |
| Global path application | RNU->GNU | When the RNU requires local path planning, but the RNU does not have a global path of a vehicle, the RNU applies to the GNU for the global path of the vehicle. After receiving the message, the GNU does not need to replan a path, but delivers a planned global path to the RNU. |
| Global path change | RNU<-GNU | Regardless of an active global path change or a passive global path change, after the GNU plans a new global path, in addition to sending the new global path to the ONU, the GNU further sends the new global path to an RNU in which the ONU is located. After receiving the changed global path, the RNU further performs new local path planning and other processing. |

TABLE 6

| Message name | Direction | Message description |
|---|---|---|
| Vehicle being about to travel in notification | RNU1->RNU2 | When a vehicle is about to travel into a coverage area of the RNU 2 from a coverage area of the RNU 1, the RNU 1 sends the notification message to the RNU 2, to notify that the vehicle is about to travel into the RNU 2. The notification message includes basic information and vehicle authentication information of the vehicle, and may also include information such as a lane into which the vehicle travels and a global path of the vehicle.<br>The message may be sent at two occasions:<br>1. The message is sent when the vehicle is about to travel into a coverage area of the RNU 2 from a coverage area of the RNU 1. Certainly, the message cannot be sent at a moment when an RNU is switched, and a specific advance is required, so as to give the RNU 2 sufficient preparation time.<br>2. The message is sent when the vehicle enters the coverage area of the RNU 1. In this case, vehicle information needs to be stored in the RNU 2 for a relatively long time. |
| Vehicle travelling-in cancellation notification | RNU1->RNU2 | After the RNU 1 has sent a "vehicle being about to travel in notification" message to the RNU 2, if a vehicle does not travel into an area of the RNU 2 any longer due to a reason such as a path change, the RNU 1 sends the notification message to the RNU 2. The RNU 2 clears related information of the vehicle after receiving the message. |
| Vehicle information | RNU1->RNU2 | The RNU 1 sends, to the RNU 2, information about a vehicle that is about to travel into the RNU 2. Content includes a lane used when the vehicle travels into the RNU 2, a global path of the vehicle, and the like. These pieces of information may also be sent in a "vehicle being about to travel in notification" message.<br>Before the vehicle travels into the RNU 2, if these pieces of information need to be changed due to a reason such as a path change, the message may also be used to instruct the RNU 2 to update information. |
| Vehicle travelling-in acknowledgement | RNU1<-RNU2 | After a vehicle has travelled into a coverage area of the RNU 2 from a coverage area of the RNU 1, and has been completely taken over by the RNU 2, the RNU 2 sends, to the RNU 1, a message indicating that the vehicle has been taken over. The RNU 1 clears related information of the vehicle after receiving the message. |

Optionally, main interface messages communicated between the onboard navigation unit and the global navigation unit by using the interface T4 may be shown in Table 7:

TABLE 7

| Message name | Direction | Message description |
|---|---|---|
| Vehicle registration/authentication | ONU->GNU | Registration of a vehicle after the vehicle accesses a traffic network needs to be authenticated, and only an authenticated vehicle can obtain a corresponding service. |
| Vehicle deregistration | ONU->GNU | When a vehicle does not need to be served by a traffic network, the vehicle applies for deregistration. |
| Vehicle heartbeat | ONU->GNU | The vehicle heartbeat message is periodically sent by the ONU, and content includes a vehicle location, speed, and direction, a vehicle health status, and the like. The ONU may not directly send the heartbeat message to the GNU. Instead, after the ONU sends the heartbeat message to the RNU, the RNU collects the heartbeat message and then sends the collected heartbeat message to the GNU. |
| Global path application | ONU->GNU | The ONU applies to the GNU for global path planning. While returning a |

TABLE 7-continued

| Message name | Direction | Message description |
| --- | --- | --- |
| | | planned global path to the ONU, the GNU also sends a copy of the planned global path to an RNU to which the ONU belongs, to ensure information synchronization of the RNU. |
| Destination selection | ONU<-GNU | When a global path is applied for, a destination specified by a passenger may be corresponding to multiple locations. In this case, the GNU presents optional destinations to the passenger for selection. |
| Destination acknowledgement | ONU->GNU | After receiving a destination selection message, the ONU sends an acknowledged unique destination to the GNU according to selection of a passenger. |
| Active global path change | ONU->GNU | The ONU applies to the GNU for a global path change. While returning a planned global path to the ONU, the GNU also sends a copy of the planned global path to an RNU to which the ONU belongs, to ensure information synchronization of the RNU. |
| Passive global path change | ONU<-GNU | When the GNU needs to change a global path of a vehicle, the GNU performs replanning according to mastered global information, and returns a new global path to the ONU after completing the planning. In addition, the GNU also sends a copy of the changed path to an RNU to which the ONU belongs. The ONU does not need to apply for this process. |

It should be understood that the interface messages in Table 4 to Table 7 are main interface messages between the units in the navigation system, and the present invention is not limited thereto. In practical application, more interface messages may be further obtained by means of extension with reference to a specific requirement, and all the interface messages obtained by means of extension shall fall within the protection scope of the present invention.

It should be understood that, the navigation system architectures in the present invention shown in FIG. 1 and FIG. 2 are merely possible implementation architectures of a navigation system, but the present invention is not limited thereto.

Figure 3:
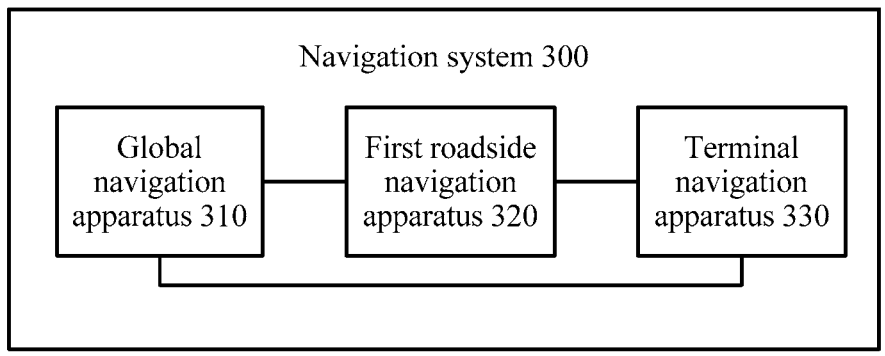
FIG. 3 is a schematic block diagram of a navigation system according to an embodiment of the present invention.

FIG. 3 is a schematic block diagram of a navigation system 300 according to an embodiment of the present invention. As shown in FIG. 3, the navigation system 300 includes a global navigation apparatus 310, a first roadside navigation apparatus 320, and a terminal navigation apparatus 330.

Optionally, the global navigation apparatus in the system may be a global navigation unit in a navigation system architecture, the roadside navigation apparatus may be a roadside navigation unit in the navigation system architecture, and the terminal navigation apparatus may be an onboard navigation unit in the navigation system architecture.

The terminal navigation apparatus 330 is configured to send a global path request to the global navigation apparatus 310. The global path request is used to request to determine a global path from a start location to a destination.

The global navigation apparatus 310 is configured to: receive the global path request sent by the terminal navigation apparatus 330, determine a road-level global path from the start location to the destination according to the global path request, and send, to the terminal navigation apparatus 330, first indication information used to indicate the global path.

The first roadside navigation apparatus 320 is configured to: determine, according to the global path, a lane-level local path corresponding to at least a part of the global path, and send, to the terminal navigation apparatus 330, second indication information used to indicate the local path.

It should be understood that the local path is in a navigation coverage area of the first roadside navigation apparatus, and the local path determined by the first roadside navigation apparatus may be a part or all of the global path determined by the global navigation apparatus 310.

The terminal navigation apparatus 330 is further configured to: receive the first indication information sent by the global navigation apparatus 310 and the second indication information sent by the first roadside navigation apparatus 320, and determine a first travelling path according to at least one of the global path indicated by the first indication information or the local path indicated by the second indication information.

Optionally, the terminal navigation apparatus may determine the travelling path according to the global path indicated by the first indication information, or may determine the travelling path according to the local path indicated by the second indication information, or may determine the travelling path according to the first indication information and the second indication information. This is not limited in the present invention.

For example, when the travelling route on the global path does not involve a lane change, the terminal navigation apparatus may directly determine the travelling path according to the global path indicated by the first indication information. When the terminal navigation apparatus needs to change a lane while travelling along the global path, the terminal navigation apparatus may determine the travelling path according to the local path indicated by the second indication information.

The navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, lane-level path planning and navigation are implemented, navigation precision is improved, and burden on the global navigation apparatus is not increased.

Optionally, the global navigation apparatus may determine the road-level global path from the start location to the destination according to all the start location, the destination, and additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type information is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the additional information may be carried in the global path request. For example, the global path request carries at least one of the global path policy information, the vehicle type information, or the driving type information; or the global path policy information may be preset. Optionally, the global navigation apparatus may pre-store or obtain, from another server, at least one of the terminal information or the driving type information. The present invention is not limited thereto.

Optionally, a global path policy may be shortest distance first, shortest time first, minimum costs first, fewest traffic lights first, or the like. The present invention is not limited thereto.

Optionally, the global path request is used to request to determine the road-level global path from the start location to the destination. The start location may be a current location of the terminal navigation apparatus, or a historical start location selected by a user from a historical start location information list on a user interface, or a specified location that is entered by a user on a user interface. The destination may be entered by a user by using a voice, or a historical destination selected from a historical destination information list, or a specified destination that is entered by a user on a user interface. The present invention is not limited thereto.

Optionally, in an embodiment, when the destination in the global path request received by the global navigation apparatus has multiple matched locations on a map, the global navigation apparatus may send information about the multiple matched locations to the terminal navigation apparatus, so that a user determines a target matched location from the multiple matched locations. In addition, after receiving information that is about the target matched location and is sent by the terminal navigation apparatus, the global navigation apparatus determines a unique destination according to the information about the target matched location, and further determines a global path from the start location to the unique destination.

Optionally, in another embodiment, when the destination in the global path request received by the global navigation apparatus has multiple matched locations on a map, the global navigation apparatus may forward information about the multiple matched locations to the terminal navigation apparatus by using the first roadside navigation apparatus, so that a user determines a target matched location from the multiple matched locations. In addition, after receiving information that is about the target matched location and is forwarded by the terminal navigation apparatus by using the roadside navigation apparatus, the global navigation apparatus determines a unique destination according to the information about the target matched location, and further determines a global path from the start location to the unique destination.

For example, the user sets a destination to a university A. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination. The first roadside navigation apparatus is responsible for sending information about these matched addresses to the terminal navigation apparatus, and sending the target destination determined by the terminal navigation apparatus to the global navigation apparatus, so that the global navigation apparatus can determine the global path from the start location to the target destination. However, this embodiment of the present invention is not limited thereto.

In this embodiment of the present invention, the first roadside navigation apparatus may obtain the global path in multiple manners. In an optional embodiment, the first roadside navigation apparatus may receive indication information that is used to indicate the global path and that is sent by the global navigation apparatus, and determine the global path according to the indication information. The global navigation apparatus may actively send the indication information to the first roadside navigation apparatus, or send the indication information to the first roadside navigation apparatus when receiving a request from the first roadside navigation apparatus. Optionally, if the navigation system has the architecture shown in FIG. 1, there is no interface between the global navigation apparatus and the terminal navigation apparatus, and the terminal navigation apparatus may send the global path request to the global navigation apparatus by using the first roadside navigation apparatus. Accordingly, after determining the global path according to the global path request, the global navigation apparatus may send the first indication information by using the first roadside navigation apparatus. In this case, the first roadside navigation apparatus may determine the global path according to the first indication information. Optionally, in another embodiment, if the navigation system has the architecture shown in FIG. 2, the terminal navigation apparatus may directly send the global path request to the global navigation apparatus, and the global navigation apparatus may directly send the first indication information to the terminal navigation apparatus. In this case, the global navigation apparatus may further send third indication information to the first roadside navigation apparatus, and the third indication information is used to indicate the global path. Accordingly, the first roadside navigation apparatus may determine the global path according to the third indication information. However, this embodiment of the present invention is not limited thereto.

Optionally, the first roadside navigation apparatus may obtain information about the global path from another roadside navigation apparatus. In an optional embodiment, the navigation system in this embodiment of the present invention may further include a second roadside navigation apparatus. A coverage area of the second roadside navigation apparatus and a coverage area of the first roadside navigation apparatus may be adjacent or may partially overlap, and the terminal navigation apparatus may enter the coverage area of the first roadside navigation apparatus from the coverage area of the second roadside navigation apparatus. In this case, when the terminal navigation apparatus is about to travel into the coverage area of the first roadside navigation apparatus from the coverage area of the second roadside navigation apparatus, the second roadside navigation apparatus may send a first travelling-in notification message to the first roadside navigation apparatus. The first travelling-in notification message carries the information about the global path. The first roadside navigation apparatus may determine the global path according to the first travelling-in notification message sent by the second roadside navigation apparatus, and may determine the local path according to the first travelling-in notification message.

Optionally, the first roadside navigation apparatus may obtain information about the global path from the terminal navigation apparatus. Specifically, before the first roadside navigation apparatus determines, according to the global path, the lane-level local path corresponding to the at least a part of the global path, the terminal navigation apparatus may send a local path request to the first roadside navigation apparatus. The local path request may carry the information about the global path. The first roadside navigation apparatus determines the global path according to the local path request sent by the terminal navigation apparatus, and may determine the local path according to the local path request. The present invention is not limited thereto.

Optionally, the first roadside navigation apparatus may determine, according to both the global path and a local path policy, the lane-level local path corresponding to the at least a part of the global path. The local path policy may be at least one of the following information: lane load balancing, frequent lane change avoidance, throughput first, or speed first; or may be another local path policy that needs to be added in practical application; or may be a local path policy other than lane load balancing and frequent lane change avoidance. The present invention is not limited thereto.

It should be understood that, throughput first is that the first roadside navigation apparatus may make a plan to enable more vehicles to travel in a lane, and speed first is that the first roadside navigation apparatus may make a plan to enable a vehicle to travel at a maximum possible speed. In practical application, if throughput first is considered, and a plan is made to enable more vehicles to travel on a road, a maximum possible speed of the vehicle is limited to some extent. Therefore, when the local path policy is used, both throughput first and speed first may be considered, or throughput first or speed first may be separately considered. This is not limited in the present invention.

Optionally, the local path policy may be carried in the local path request, for example, the local path request carries the global path and the local path policy; or the local path policy may be preset. The present invention is not limited thereto.

Optionally, the navigation system in this embodiment of the present invention may further include a third roadside navigation apparatus. A coverage area of the third roadside navigation apparatus and the coverage area of the first roadside navigation apparatus are adjacent or partially overlap. When the terminal navigation apparatus is about to travel into the coverage area of the third roadside navigation apparatus from the coverage area of the first roadside navigation apparatus, the first roadside navigation apparatus may send a second travelling-in notification message to the third roadside navigation apparatus, and the second travelling-in notification message carries the information about the global path, so that the third roadside navigation apparatus determines the local path according to the global path.

When the terminal navigation apparatus has travelled into the coverage area of the third roadside navigation apparatus, the third roadside navigation apparatus may send a second travelling-in acknowledgement message to the first roadside navigation apparatus. The second travelling-in acknowledgement message is used to acknowledge that the terminal navigation apparatus has entered the coverage area of the third roadside navigation apparatus. After receiving the second travelling-in acknowledgement message sent by the third roadside navigation apparatus, the first roadside navigation apparatus may clear related information of the terminal navigation apparatus that is stored in the first roadside navigation apparatus, for example, the related information may be the global path determined by the global navigation apparatus and vehicle information of the vehicle corresponding to the terminal navigation apparatus in this embodiment of the present invention. This is not limited in the present invention.

Optionally, the second travelling-in notification message may be sent to the third roadside navigation apparatus when the terminal navigation apparatus is about to travel out of the coverage area of the first roadside navigation apparatus, or may be sent to the third roadside navigation apparatus when the terminal navigation apparatus just travels into the coverage area of the first roadside navigation apparatus, so that the third roadside navigation apparatus has sufficient time to determine, for the terminal navigation apparatus, a local path in the coverage area of the third roadside navigation apparatus. The present invention is not limited thereto.

Optionally, the navigation system in this embodiment of the present invention may further include a fourth roadside navigation apparatus. A coverage area of the fourth roadside navigation apparatus and the coverage area of the first roadside navigation apparatus are adjacent or partially overlap. When the terminal navigation apparatus determines, after the first roadside navigation apparatus sends the second travelling-in notification message to the third roadside navigation apparatus, not to travel into the coverage area of the third roadside navigation apparatus any longer but to travel into the coverage area of the fourth roadside navigation apparatus due to a reason such as a journey change or an actual road condition, the first roadside navigation apparatus may send a second travelling-in cancellation message to the third roadside navigation apparatus. After receiving the second travelling-in cancellation message, the third roadside navigation apparatus may clear related information of the terminal navigation apparatus that is stored in the third roadside navigation apparatus, for example, the related information may be the global path determined by the global navigation apparatus and the vehicle information of the vehicle corresponding to the terminal navigation apparatus in this embodiment of the present invention. This is not limited in the present invention.

It should be understood that, the terminal navigation apparatus may periodically send, to the global navigation apparatus, the vehicle information of the vehicle corresponding to the terminal navigation apparatus, or send, to the global navigation apparatus by using the first roadside navigation apparatus, the vehicle information of the vehicle corresponding to the terminal navigation apparatus, so that the global navigation apparatus obtains the vehicle information, and monitors the vehicle in real time. The vehicle information may include current location information, current speed information, current running status information, and the like. The present invention is not limited thereto.

Optionally, the terminal navigation apparatus may send a heartbeat message to the global navigation apparatus, and add, to the heartbeat message, the vehicle information of the vehicle corresponding to the terminal navigation apparatus. Alternatively, the terminal navigation apparatus may send a heartbeat message to the global navigation apparatus by using the first roadside navigation apparatus, and add the vehicle information to the heartbeat message, so that the first roadside navigation apparatus may collect vehicle information of all vehicles in the coverage area, and then send the collected vehicle information to the global navigation apparatus together.

Optionally, in an embodiment, when the terminal navigation apparatus determines that there is a need to change the travelling path or the destination due to a reason such as a journey change or an actual road condition, the terminal navigation apparatus may send a global path change request to the global navigation apparatus. The global path change request is used to request to plan a first global path from a first start location to a first destination. The global navigation apparatus determines the first global path according to the first start location and the first destination, and sends the first global path to the terminal navigation apparatus. The first start location may usually be the current location of the terminal navigation apparatus, and the first destination may be a target destination re-determined by the terminal navigation apparatus.

Optionally, in another embodiment, when the terminal navigation apparatus determines that there is a need to change the travelling path or the destination due to a reason such as a journey change or an actual road condition, the terminal navigation apparatus may forward a global path change request to the global navigation apparatus by using the first roadside navigation apparatus. The global path change request is used to request to plan a first global path from a first start location to a first destination. The global navigation apparatus determines the first global path according to the first start location and the first destination, and forwards the first global path to the terminal navigation apparatus by using the first roadside navigation apparatus, so that the first roadside navigation apparatus determines a first local path according to the first global path. The first start location may usually be the current location of the terminal navigation apparatus, and the first destination may be a target destination re-determined by the terminal navigation apparatus.

Optionally, in an embodiment, when the global navigation apparatus determines that the travelling path of the terminal navigation apparatus deviates from the global path, or that there is temporary construction or road closure in the front of the travelling path, and the terminal navigation apparatus needs to make a detour, the global navigation apparatus may determine a second global path according to current location information of the terminal navigation apparatus, and send the second global path to the terminal navigation apparatus.

Optionally, in another embodiment, when the global navigation apparatus determines that the travelling path of the terminal navigation apparatus deviates from the global path, or that there is temporary construction or road closure in the front of the travelling path, and the terminal navigation apparatus needs to make a detour, the global navigation apparatus may forward a second global path to the terminal navigation apparatus by using the first roadside navigation apparatus, so that the first roadside navigation apparatus determines a second local path according to the second global path.

Optionally, in another embodiment, when the terminal navigation apparatus needs to actively change a travelling lane while travelling along the global path, for example, when the terminal navigation apparatus determines that there is a need to overtake actively, the terminal navigation apparatus may further send a local path change request to the first roadside navigation apparatus. The localpath change request is used to request to re-determine a local path. The first roadside navigation apparatus determines a third local path according to current location information of the terminal navigation apparatus and the global path, and sends the third local path to the terminal navigation apparatus, so that the terminal navigation apparatus re-determines a travelling path according to the third local path and the global path. However, the present invention is not limited thereto.

Optionally, in another embodiment, when the first roadside navigation apparatus determines that lane load is unbalanced in the front of the travelling path of the terminal navigation apparatus and a lane needs to be changed, or the first roadside navigation apparatus determines that the travelling path of the terminal navigation apparatus deviates from the local path, the first roadside navigation apparatus may determine a fourth local path according to current location information of the terminal navigation apparatus, the global path, and the local path policy, and send the fourth local path to the terminal navigation apparatus.

Optionally, the terminal navigation apparatus may further autonomously plan a path. When the terminal navigation apparatus detects that an emergency occurs around the terminal navigation apparatus, for example, detects that there is an obstacle ahead or that a preceding vehicle makes emergency braking, and the terminal navigation apparatus needs to make an emergency road change or emergency braking, the terminal navigation apparatus may perform emergency path adjustment for this emergency to determine an autonomously planned path, and report this emergency and the autonomously planned path to the first roadside navigation apparatus. In addition, the terminal navigation apparatus may instruct, by means of terminal-to-terminal communication or terminal-to-infrastructure communication, surrounding terminals to make emergency avoidance. Precision of the autonomously planned path may be at a road level or a lane level, and the present invention is not limited thereto.

Optionally, in an embodiment, the terminal navigation apparatus may send a terminal registration request to the global navigation apparatus. The terminal registration request is used to request the global navigation apparatus to authenticate the terminal navigation apparatus. The global navigation apparatus sends a terminal registration acknowledgement to the terminal navigation apparatus according to the terminal registration request.

Optionally, in another embodiment, the terminal navigation apparatus may forward a terminal registration request to the global navigation apparatus by using the first roadside navigation apparatus. The terminal registration request is used to request the global navigation apparatus to authenticate the terminal navigation apparatus. The global navigation apparatus sends, by using the first roadside navigation apparatus, a terminal registration acknowledgement determined according to the terminal registration request to the terminal navigation apparatus.

For example, when the vehicle corresponding to the terminal navigation apparatus is started, the terminal navigation apparatus may directly send the terminal registration request to the global navigation apparatus, or forward the terminal registration request to the global navigation apparatus by using the first roadside navigation apparatus. The terminal registration request carries identification information of the terminal navigation apparatus. After receiving the terminal registration request, the global navigation apparatus performs authentication processing on the terminal navigation apparatus according to the identification information of the terminal navigation apparatus, and after authentication succeeds, sends the terminal registration acknowledgement to the terminal navigation apparatus, or forwards the terminal registration acknowledgement by using the first roadside navigation apparatus.

Optionally, the terminal navigation apparatus may receive information that is used to indicate an identifier of the first roadside navigation apparatus and that is sent by the global navigation apparatus, and determine, according to the identifier of the first roadside navigation apparatus, that the terminal navigation apparatus is in the coverage area of the first roadside navigation apparatus, so as to communicate with first roadside navigation apparatus.

Optionally, the global navigation apparatus may determine, according to location information and identification information of the terminal navigation apparatus, that the terminal navigation apparatus is in the coverage area of the first roadside navigation apparatus, and send, to the terminal navigation apparatus, information used to indicate an identifier of the first roadside navigation apparatus.

Optionally, for example, the current location information and the identification information of the terminal navigation apparatus may be carried in the terminal registration request and sent to the global navigation apparatus, or may be forwarded to the global navigation apparatus by using the first roadside navigation apparatus. This is not limited in the present invention.

Optionally, for example, the current location information and the identification information of the terminal navigation apparatus may be carried in the heartbeat message and sent to the global navigation apparatus, or may be forwarded to the global navigation apparatus by using the first roadside navigation apparatus. This is not limited in the present invention.

Optionally, the terminal navigation apparatus may detect current location information of the corresponding vehicle, or obtain current location information of the corresponding vehicle by using another detection apparatus. This is not limited in the present invention.

Optionally, identification information of the vehicle corresponding to the terminal navigation apparatus may be pre-stored in the terminal navigation apparatus, or may be obtained in another manner. For example, the identification information may be an identify (Identity, ID) or a subscriber identity module (Subscriber Identity Module, SIM) of the vehicle. This is not limited in the present invention.

Optionally, in an embodiment, during construction of the navigation system in this embodiment of the present invention, the first roadside navigation apparatus may send a first roadside navigation registration request to the global navigation apparatus. The first roadside navigation registration request is used to request to activate the first roadside navigation apparatus. The first roadside navigation registration request may carry the identification information of the first roadside navigation apparatus, so that the global navigation apparatus monitors a running status of the first roadside navigation apparatus according to the identification information of the first roadside navigation apparatus. The present invention is not limited thereto.

Optionally, when the first roadside navigation apparatus determines that there is a need to stop a local path planning service, the first roadside navigation apparatus may send a first roadside navigation deregistration request to the global navigation apparatus. The first roadside navigation deregistration request is used to request to deactivate the first roadside navigation apparatus. The first roadside navigation registration request may carry the identification information of the first roadside navigation apparatus. The global navigation apparatus may deactivate the first roadside navigation apparatus according to the identification information of the first roadside navigation apparatus, and send a roadside navigation deregistration acknowledgement message to the first roadside navigation apparatus. The first roadside navigation apparatus exits the local path planning service, and clears related information, except necessary vehicle information stored in a log, that is of the terminal navigation apparatus and that is stored in the first roadside navigation apparatus, for example, the related information may be the global path determined by the global navigation apparatus and the vehicle information of the vehicle corresponding to the terminal navigation apparatus in this embodiment of the present invention. This is not limited in the present invention.

Optionally, in an embodiment, the terminal navigation apparatus may send a terminal deregistration request to the global navigation apparatus. The terminal deregistration request is used to request to deregister the terminal navigation apparatus. The global navigation apparatus may clear the related information of the terminal navigation apparatus after receiving the terminal deregistration request. After completing clearing, the global navigation apparatus sends a terminal deregistration acknowledgement message to the terminal navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

Optionally, in another embodiment, the terminal navigation apparatus may forward a terminal deregistration request to the global navigation apparatus by using the first roadside navigation apparatus. The global navigation apparatus may clear the related information of the terminal navigation apparatus after receiving the terminal deregistration request. After completing clearing, the global navigation apparatus may further forward a terminal deregistration acknowledgement message to the terminal navigation apparatus by using the first roadside navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

For example, when the vehicle corresponding to the terminal navigation apparatus arrives at a travelling destination, and stops and stalls, the terminal navigation apparatus may send the terminal deregistration request to the global navigation apparatus, or forward the terminal deregistration request to the global navigation apparatus by using the first roadside navigation apparatus. The global navigation apparatus clears the stored related information of the terminal navigation apparatus after receiving the terminal deregistration request. After completing clearing, the global navigation apparatus sends the terminal deregistration acknowledgement message to the terminal navigation apparatus, or forwards the terminal deregistration acknowledgement message to the terminal navigation apparatus by using the first roadside navigation apparatus.

It should be understood that, there may be one or more driving navigation path planning processes in a period from registration to deregistration of a terminal navigation apparatus, until a vehicle finally stops and stalls. This is not limited in the present invention.

The navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, navigation precision is improved, and the navigation system can be applicable to a large-scale self-driving scenario. The global navigation apparatus distributes massive lane-level path navigation services to multiple roadside navigation apparatuses, and a failure of a single roadside navigation apparatus does not cause breakdown of the entire system, so that system reliability is improved.

In the navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

A schematic block diagram of the navigation system in the embodiments of the present invention is described above with reference to FIG. 3. A navigation method in the embodiments of the present invention is described below in detail with reference to FIG. 4 to FIG. 6.

Figure 4:
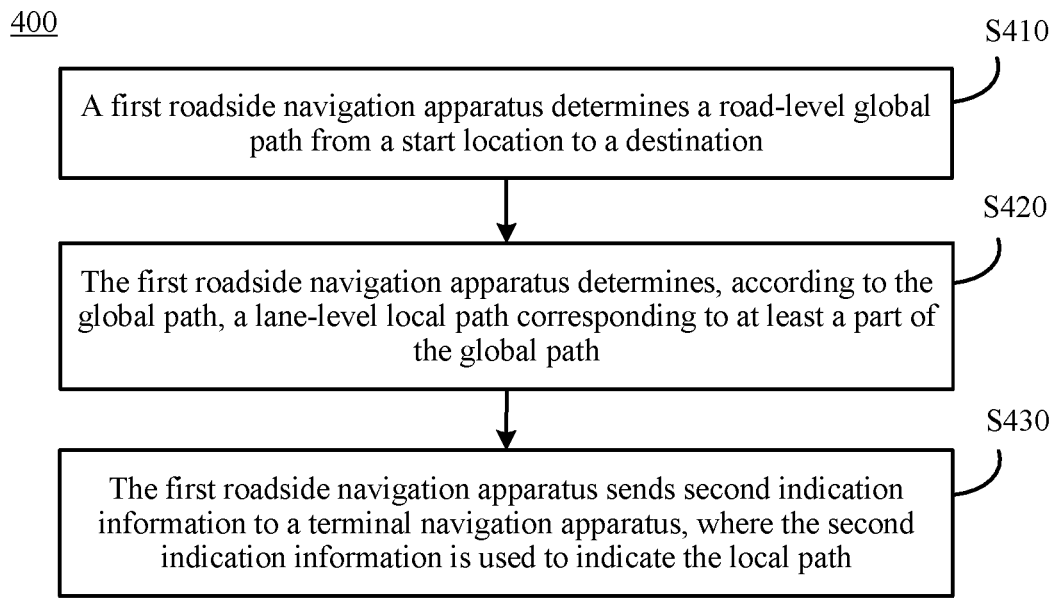
FIG. 4 is a schematic flowchart of a navigation method according to an embodiment of the present invention.

FIG. 4 is a schematic flowchart of a navigation method 400 according to an embodiment of the present invention. For example, the navigation method 400 may be performed by a first roadside navigation apparatus in a navigation system. As shown in FIG. 4, the navigation method 400 includes the following steps.

S410. The first roadside navigation apparatus determines a road-level global path from a start location to a destination.

S420. The first roadside navigation apparatus determines, according to the global path, a lane-level local path corresponding to at least a part of the global path.

It should be understood that the local path is in a navigation coverage area of the first roadside navigation apparatus, and the local path determined by the first roadside navigation apparatus may be a part or all of the global path.

S430. The first roadside navigation apparatus sends second indication information to a terminal navigation apparatus, where the second indication information is used to indicate the local path.

Therefore, according to the navigation method in this embodiment of the present invention, a first roadside navigation apparatus determines a road-level global path from a start location to a destination; determines, according to the global path, a lane-level local path corresponding to at least a part of the global path; and sends, to the terminal navigation apparatus, second indication information used to indicate the local path. Therefore, lane-level path planning and navigation are implemented, navigation precision is improved, and burden on a global navigation apparatus is not increased.

In this embodiment of the present invention, the first roadside navigation apparatus may obtain the global path in multiple manners. In an optional embodiment, the first roadside navigation apparatus may receive indication information that is used to indicate the global path and that is sent by the global navigation apparatus, and determine the global path according to the indication information. The global navigation apparatus may actively send the indication information to the first roadside navigation apparatus, or send the indication information to the first roadside navigation apparatus when receiving a request from the first roadside navigation apparatus. Optionally, if the navigation system has the architecture shown in FIG. 1, there is no interface between the global navigation apparatus and the terminal navigation apparatus, and the terminal navigation apparatus may send the global path request to the global navigation apparatus by using the first roadside navigation apparatus. Accordingly, after determining the global path according to the global path request, the global navigation apparatus may send the first indication information by using the first roadside navigation apparatus. In this case, the first roadside navigation apparatus may determine the global path according to the first indication information. Optionally, in another embodiment, if the navigation system has the architecture shown in FIG. 2, the terminal navigation apparatus may directly send the global path request to the global navigation apparatus, and the global navigation apparatus may directly send the first indication information to the terminal navigation apparatus. In this case, the global navigation apparatus may further send third indication information to the first roadside navigation apparatus, and the third indication information is used to indicate the global path. Accordingly, the first roadside navigation apparatus may determine the global path according to the third indication information. However, this embodiment of the present invention is not limited thereto.

Optionally, before S410, if the first roadside navigation apparatus receives the global path request sent by the terminal navigation apparatus, the first roadside navigation apparatus may forward, to the global navigation apparatus, the global path request sent by the terminal navigation apparatus. The global path request is used to request to determine the road-level global path from the start location to the destination. The start location may be a current location of the terminal navigation apparatus, or a historical start location selected by a user from a historical start location information list on a user interface, or a specified location that is entered by a user on a user interface. The destination may be entered by a user by using a voice, or a historical destination selected from a historical destination information list, or a specified destination that is entered by a user on a user interface. The present invention is not limited thereto.

Optionally, in an embodiment, when the destination in the global path request received by the global navigation apparatus has multiple matched locations on a map, the global navigation apparatus may further send information about the multiple matched locations to the first roadside navigation apparatus, so that a user determines a target matched location from the multiple matched locations. In this case, the first roadside navigation apparatus may forward the information about the multiple matched locations to the terminal navigation apparatus, and forward information about the target matched location to the global navigation apparatus after receiving the information that is about the target matched location and that is sent by the terminal navigation apparatus, so that the global navigation apparatus determines a unique destination according to the information about the target matched location, and further determines a global path from the start location to the unique destination.

For example, the user sets a destination to a university A. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination. The first roadside navigation apparatus is responsible for sending information about these matched addresses to the terminal navigation apparatus, and sending the target destination determined by the terminal navigation apparatus to the global navigation apparatus, so that the global navigation apparatus can determine the global path from the start location to the target destination. However, this embodiment of the present invention is not limited thereto.

Optionally, in S410, the first roadside navigation apparatus may obtain information about the global path from another roadside navigation apparatus. In an optional embodiment, the navigation system in this embodiment of the present invention may further include a second roadside navigation apparatus. A coverage area of the second roadside navigation apparatus and a coverage area of the first roadside navigation apparatus may be adjacent or may partially overlap, and the terminal navigation apparatus may enter the coverage area of the first roadside navigation apparatus from the coverage area of the second roadside navigation apparatus. In this case, when the terminal navigation apparatus is about to travel into the coverage area of the first roadside navigation apparatus from the coverage area of the second roadside navigation apparatus, the second roadside navigation apparatus may send a first travelling-in notification message to the first roadside navigation apparatus. The first travelling-in notification message carries the information about the global path. The first roadside navigation apparatus may determine the global path according to the first travelling-in notification message sent by the second roadside navigation apparatus, and may determine the local path according to the first travelling-in notification message.

Optionally, in S410, the first roadside navigation apparatus may obtain information about the global path from the terminal navigation apparatus. Specifically, before the first roadside navigation apparatus determines, according to the global path, the lane-level local path corresponding to the at least a part of the global path, the terminal navigation apparatus may send a local path request to the first roadside navigation apparatus. The local path request may carry the information about the global path. In this case, the first roadside navigation apparatus may determine the global path according to the local path request sent by the terminal navigation apparatus, and may determine the local path according to the local path request. The present invention is not limited thereto.

In S420, the first roadside navigation apparatus may determine the local path according to the global path. Optionally, the first roadside navigation apparatus may determine, according to both the global path and a local path policy, the lane-level local path corresponding to the at least a part of the global path. The local path policy may be at least one of the following information: lane load balancing, frequent lane change avoidance, throughput first, or speed first; or may be another local path policy that needs to be added in practical application; or may be a local path policy other than lane load and frequent lane change avoidance. The present invention is not limited thereto.

It should be understood that, throughput first is that the first roadside navigation apparatus may make a plan to enable more vehicles to travel in a lane, and speed first is that the first roadside navigation apparatus may make a plan to enable a vehicle to travel at a maximum possible speed. In practical application, if throughput first is considered, and a plan is made to enable more vehicles to travel on a road, a maximum possible speed of the vehicle is limited to some extent. Therefore, when the local path policy is used, both throughput first and speed first may be considered, or throughput first or speed first may be separately considered. This is not limited in the present invention.

Optionally, the local path policy may be carried in the local path request, for example, the local path request carries the global path and the local path policy; or the local path policy may be preset. The present invention is not limited thereto.

Optionally, the navigation system in this embodiment of the present invention may further include a third roadside navigation apparatus. A coverage area of the third roadside navigation apparatus and the coverage area of the first roadside navigation apparatus are adjacent or partially overlap. When the terminal navigation apparatus is about to travel into the coverage area of the third roadside navigation apparatus from the coverage area of the first roadside navigation apparatus, the first roadside navigation apparatus may send a second travelling-in notification message to the third roadside navigation apparatus, and the second travelling-in notification message carries the information about the global path, so that the third roadside navigation apparatus determines the local path according to the global path.

When the terminal navigation apparatus has travelled into the coverage area of the third roadside navigation apparatus, the third roadside navigation apparatus may send a second travelling-in acknowledgement message to the first roadside navigation apparatus. The second travelling-in acknowledgement message is used to acknowledge that the terminal navigation apparatus has entered the coverage area of the third roadside navigation apparatus. After receiving the second travelling-in acknowledgement message sent by the third roadside navigation apparatus, the first roadside navigation apparatus may clear related information of the terminal navigation apparatus that is stored in the first roadside navigation apparatus, for example, the related information may be the global path determined by the global navigation apparatus and vehicle information of a vehicle corresponding to the terminal navigation apparatus in this embodiment of the present invention. This is not limited in the present invention.

Optionally, the second travelling-in notification message may be sent to the third roadside navigation apparatus when the terminal navigation apparatus is about to travel out of the coverage area of the first roadside navigation apparatus, or may be sent to the third roadside navigation apparatus when the terminal navigation apparatus just travels into the first roadside navigation apparatus, so that the third roadside navigation apparatus has sufficient time to determine, for the terminal navigation apparatus, a local path in the coverage area of the third roadside navigation apparatus. The present invention is not limited thereto.

Optionally, the navigation system in this embodiment of the present invention may further include a fourth roadside navigation apparatus. A coverage area of the fourth roadside navigation apparatus and the coverage area of the first roadside navigation apparatus are adjacent or partially overlap. When the terminal navigation apparatus determines, after the first roadside navigation apparatus sends the second travelling-in notification message to the third roadside navigation apparatus, not to travel into the coverage area of the third roadside navigation apparatus any longer but to travel into the coverage area of the fourth roadside navigation apparatus due to a reason such as a journey change or an actual road condition, the first roadside navigation apparatus may send a second travelling-in cancellation message to the third roadside navigation apparatus. After receiving the second travelling-in cancellation message, the third roadside navigation apparatus may clear related information of the terminal navigation apparatus that is stored in the third roadside navigation apparatus, for example, the related information may be the global path determined by the global navigation apparatus and the vehicle information of the vehicle corresponding to the terminal navigation apparatus in this embodiment of the present invention. This is not limited in the present invention.

It should be understood that, the terminal navigation apparatus may send the vehicle information to the global navigation apparatus by using the first roadside navigation apparatus, so that the global navigation apparatus obtains the vehicle information, and monitors the vehicle in real time. The vehicle information may include current location information, current speed information, current running status information, and the like. The present invention is not limited thereto.

Optionally, the terminal navigation apparatus may send a heartbeat message to the global navigation apparatus by using the first roadside navigation apparatus, and add the vehicle information to the heartbeat message, so that the first roadside navigation apparatus may collect vehicle information of all vehicles in the coverage area, and then send the collected vehicle information to the global navigation apparatus together.

Optionally, in an embodiment, when the terminal navigation apparatus determines that there is a need to change a travelling path or the destination due to a reason such as a journey change or an actual road condition, the terminal navigation apparatus may forward the global path change request to the global navigation apparatus by using the first roadside navigation apparatus. The global path change request is used to request to plan a first global path from a first start location to a first destination. The global navigation apparatus determines the first global path according to the first start location and the first destination, and forwards the first global path to the terminal navigation apparatus by using the first roadside navigation apparatus, so that the first roadside navigation apparatus determines a first local path according to the first global path. The first start location may usually be the current location of the terminal navigation apparatus, and the first destination may be a target destination re-determined by the terminal navigation apparatus.

Optionally, in another embodiment, when the global navigation apparatus determines that a travelling path of the terminal navigation apparatus deviates from the global path, or that there is temporary construction or road closure in the front of a travelling path, and the terminal navigation apparatus needs to make a detour, the global navigation apparatus may forward the second global path to the terminal navigation apparatus by using the first roadside navigation apparatus, so that the first roadside navigation apparatus determines a second local path according to the second global path.

Optionally, in another embodiment, when the terminal navigation apparatus needs to actively change a travelling lane while travelling along the global path, for example, when the terminal navigation apparatus determines that there is a need to overtake actively, the terminal navigation apparatus may further send a local path change request to the first roadside navigation apparatus. The global path change request is used to request to re-determine a local path. The first roadside navigation apparatus re-determines a third local path according to current location information of the terminal navigation apparatus and the global path, and sends the third local path to the terminal navigation apparatus, so that the terminal navigation apparatus re-determines a travelling path according to the third local path and the global path. However, the present invention is not limited thereto.

Optionally, in another embodiment, when the first roadside navigation apparatus determines that lane load is unbalanced in the front of a travelling path of the terminal navigation apparatus and a lane needs to be changed, or the first roadside navigation apparatus determines that a travelling path of the terminal navigation apparatus deviates from the local path, the first roadside navigation apparatus may determine a fourth local path according to current location information of the terminal navigation apparatus, the global path, and the local path policy, and send the fourth local path to the terminal navigation apparatus.

Optionally, the terminal navigation apparatus may further autonomously plan a path. When the terminal navigation apparatus detects that an emergency occurs around the terminal navigation apparatus, for example, detects that there is an obstacle ahead or that a preceding vehicle makes emergency braking, and the terminal navigation apparatus needs to make an emergency road change or emergency braking, the terminal navigation apparatus may perform emergency path adjustment for this emergency to determine an autonomously planned path, and report this emergency and the autonomously planned path to the first roadside navigation apparatus. In addition, the terminal navigation apparatus may instruct, by means of terminal-to-terminal communication or terminal-to-infrastructure communication, surrounding terminals to make emergency avoidance. Precision of the autonomously planned path may be at a road level or a lane level, and the present invention is not limited thereto.

Optionally, in an embodiment, the first roadside navigation apparatus may replan a local path of the terminal navigation apparatus according to information about an autonomously planned path and a heartbeat message that are reported by the terminal navigation apparatus. The present invention is not limited thereto.

Optionally, in another embodiment, the terminal navigation apparatus may forward a terminal registration request to the global navigation apparatus by using the first roadside navigation apparatus. The terminal registration request is used to request the global navigation apparatus to authenticate the terminal navigation apparatus. The global navigation apparatus sends, by using the first roadside navigation apparatus, a terminal registration acknowledgement determined according to the terminal registration request to the terminal navigation apparatus.

For example, when the vehicle corresponding to the terminal navigation apparatus is powered on, the terminal navigation apparatus may directly send the terminal registration request to the global navigation apparatus, or forward the terminal registration request to the global navigation apparatus by using the first roadside navigation apparatus. The terminal registration request carries identification information of the terminal navigation apparatus. After receiving the terminal registration request, the global navigation apparatus performs authentication processing on the terminal navigation apparatus according to the identification information of the terminal navigation apparatus, and after authentication succeeds, sends the terminal registration acknowledgement to the terminal navigation apparatus, or forwards the terminal registration acknowledgement by using the first roadside navigation apparatus.

Optionally, the terminal navigation apparatus may receive information that is used to indicate an identifier of the first roadside navigation apparatus and that is sent by the global navigation apparatus, and determine, according to the identifier of the first roadside navigation apparatus, that the terminal navigation apparatus is in the coverage area of the first roadside navigation apparatus, so as to communicate with first roadside navigation apparatus.

Optionally, the global navigation apparatus may determine, according to location information and identification information of the terminal navigation apparatus, that the terminal navigation apparatus is in the coverage area of the first roadside navigation apparatus, and send, to the terminal navigation apparatus, information used to indicate an identifier of the first roadside navigation apparatus.

Optionally, for example, the current location information and the identification information of the terminal navigation apparatus may be forwarded to the global navigation apparatus by using the first roadside navigation apparatus. This is not limited in the present invention.

Optionally, the terminal navigation apparatus may detect current location information of the corresponding vehicle, or obtain current location information of the corresponding vehicle by using another detection apparatus. This is not limited in the present invention.

Optionally, identification information of the vehicle corresponding to the terminal navigation apparatus may be pre-stored in the terminal navigation apparatus, or may be obtained in another manner. For example, the identification information may be an identify (Identity, ID) or a subscriber identity module (Subscriber Identity Module, SIM) of the vehicle. This is not limited in the present invention.

Optionally, in an embodiment, during construction of the navigation system in this embodiment of the present invention, the first roadside navigation apparatus may send a first roadside navigation registration request to the global navigation apparatus. The first roadside navigation registration request is used to request to activate the first roadside navigation apparatus. The first roadside navigation registration request may carry the identification information of the first roadside navigation apparatus, so that the global navigation apparatus monitors a running status of the first roadside navigation apparatus according to the identification information of the first roadside navigation apparatus. The present invention is not limited thereto.

Optionally, when the first roadside navigation apparatus determines that there is a need to stop a local path planning service, the first roadside navigation apparatus may send a first roadside navigation deregistration request to the global navigation apparatus. The first roadside navigation deregistration request is used to request to deactivate the first roadside navigation apparatus. The first roadside navigation registration request may carry the identification information of the first roadside navigation apparatus. The global navigation apparatus may deactivate the first roadside navigation apparatus according to the identification information of the first roadside navigation apparatus, and send a roadside navigation deregistration acknowledgement message to the first roadside navigation apparatus. The first roadside navigation apparatus exits the local path planning service, and clears the related information, except necessary vehicle information stored in a log, that is of the terminal navigation apparatus and that is stored in the first roadside navigation apparatus, for example, the related information may be the global path determined by the global navigation apparatus and the vehicle information of the vehicle corresponding to the terminal navigation apparatus in this embodiment of the present invention. This is not limited in the present invention.

Optionally, in another embodiment, the terminal navigation apparatus may forward the terminal deregistration request to the global navigation apparatus by using the first roadside navigation apparatus. The global navigation apparatus may clear the related information of the terminal navigation apparatus after receiving the terminal deregistration request. After completing clearing, the global navigation apparatus may further forward the terminal deregistration acknowledgement message to the terminal navigation apparatus by using the first roadside navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

For example, when the vehicle corresponding to the terminal navigation apparatus arrives at a travelling destination, and stops and stalls, the terminal navigation apparatus may forward the terminal deregistration request to the global navigation apparatus by using the first roadside navigation apparatus. The global navigation apparatus clears the stored related information of the terminal navigation apparatus after receiving the terminal deregistration request. After completing clearing, the global navigation apparatus may forward the terminal deregistration acknowledgement message to the terminal navigation apparatus by using the first roadside navigation apparatus.

Therefore, according to the navigation method in this embodiment of the present invention, a first roadside navigation apparatus determines a road-level global path from a start location to a destination; determines, according to the global path, a lane-level local path corresponding to at least a part of the global path; and sends, to the terminal navigation apparatus, second indication information used to indicate the local path. Therefore, navigation precision is improved, and the navigation method can be applicable to a large-scale self-driving scenario. A global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 5:
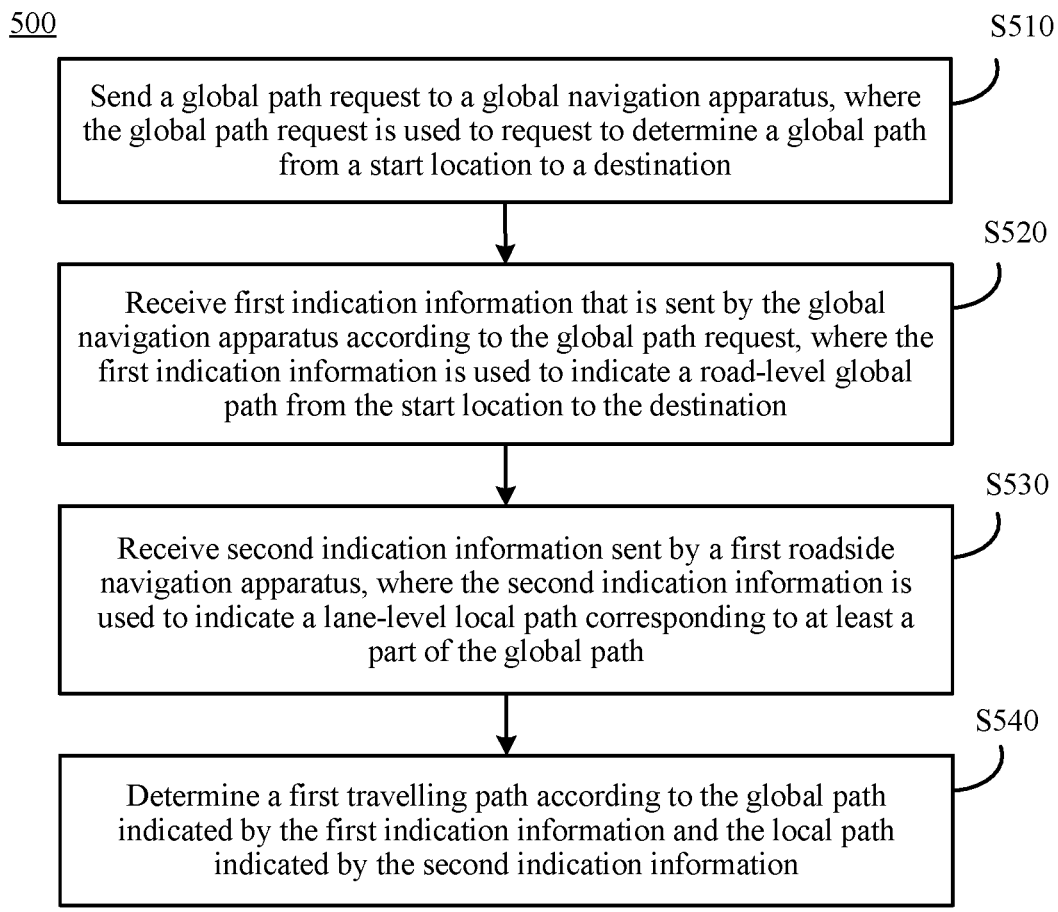
FIG. 5 is a schematic flowchart of a navigation method according to an embodiment of the present invention.

FIG. 5 is a schematic flowchart of a navigation method according to an embodiment of the present invention. For example, the method 500 may be performed by a terminal navigation apparatus in a navigation system. As shown in FIG. 5, the method 500 includes the following steps.

S510. Send a global path request to a global navigation apparatus, where the global path request is used to request to determine a global path from a start location to a destination.

Optionally, the terminal navigation apparatus may directly send the global path request to the global navigation apparatus, or may send the global path request to the global navigation apparatus by using a first roadside navigation apparatus.

S520. Receive first indication information that is sent by the global navigation apparatus according to the global path request, where the first indication information is used to indicate a road-level global path from the start location to the destination.

Optionally, the terminal navigation apparatus may directly receive the first indication information that is sent by the global navigation apparatus according to the global path request, or may receive the first indication information that is sent by the global navigation apparatus according to the global path request by using the first roadside navigation apparatus.

S530. Receive second indication information sent by a first roadside navigation apparatus, where the second indication information is used to indicate a lane-level local path corresponding to at least a part of the global path.

It should be understood that the local path is in a navigation coverage area of the first roadside navigation apparatus, and the local path determined by the first roadside navigation apparatus may be a part or all of the global path.

S540. Determine a first travelling path according to at least one of the global path indicated by the first indication information or the local path indicated by the second indication information.

Optionally, the first indication information may be directly sent by the global navigation apparatus, or may be sent by the global navigation apparatus by using the first roadside navigation apparatus.

Optionally, the terminal navigation apparatus may determine the travelling path according to the global path indicated by the first indication information, or may determine the travelling path according to the local path indicated by the second indication information, or may determine the travelling path according to the first indication information and the second indication information. This is not limited in the present invention.

It should be understood that, the terminal navigation apparatus may determine the travelling path only according to the local path, or may determine the travelling path according to the global path and the local path. For example, when the local path indicated by the second indication information indicates only a travelling lane of the terminal navigation apparatus, the terminal navigation apparatus may determine, according to the global path and the local path, a specific lane that is of a specific road and in which the terminal navigation apparatus travels. This is not limited in the present invention.

For example, when the travelling route on the global path does not involve a lane change, the terminal navigation apparatus may directly determine the travelling path according to the global path indicated by the first indication information. When the terminal navigation apparatus needs to change a lane while travelling along the global path, the terminal navigation apparatus may determine the travelling path according to the local path indicated by the second indication information.

Therefore, according to the navigation method in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, lane-level path planning and navigation are implemented, navigation precision is improved, and burden on the global navigation apparatus is not increased.

Optionally, in S510, the global path request is used to request to determine the road-level global path from the start location to the destination. The start location may be a current location of the terminal navigation apparatus, or a historical start location selected by a user from a historical start location information list on a user interface, or a specified location that is entered by a user on a user interface. The destination may be entered by a user by using a voice, or a historical destination selected from a historical destination information list, or a specified destination that is entered by a user on a user interface. The present invention is not limited thereto.

Optionally, in an embodiment, when the destination in the global path request received by the global navigation apparatus has multiple matched locations on a map, the global navigation apparatus may send information about the multiple matched locations to the terminal navigation apparatus, so that a user determines a target matched location from the multiple matched locations. In addition, after receiving information that is about the target matched location and is sent by the terminal navigation apparatus, the global navigation apparatus determines a unique destination according to the information about the target matched location, and further determines a global path from the start location to the unique destination.

Optionally, in another embodiment, when the destination in the global path request received by the global navigation apparatus has multiple matched locations on a map, the global navigation apparatus may forward information about the multiple matched locations to the terminal navigation apparatus by using the first roadside navigation apparatus, so that a user determines a target matched location from the multiple matched locations. In addition, after receiving information that is about the target matched location and is forwarded by the terminal navigation apparatus by using the roadside navigation apparatus, the global navigation apparatus determines a unique destination according to the information about the target matched location, and further determines a global path from the start location to the unique destination.

For example, the user sets a destination to a university A. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination. The first roadside navigation apparatus is responsible for sending information about these matched addresses to the terminal navigation apparatus, and sending the target destination determined by the terminal navigation apparatus to the global navigation apparatus, so that the global navigation apparatus can determine the global path from the start location to the target destination. However, this embodiment of the present invention is not limited thereto.

Optionally, before S530, the terminal navigation apparatus may send a local path request to the first roadside navigation apparatus. The local path request may carry information about the global path. The first roadside navigation apparatus may determine the global path according to the local path request sent by the terminal navigation apparatus, and may determine the local path according to the local path request. The present invention is not limited thereto.

Optionally, the first roadside navigation apparatus may determine, according to both the global path and a local path policy, the lane-level local path corresponding to the at least a part of the global path. The local path policy may be at least one of the following information: lane load balancing, frequent lane change avoidance, throughput first, or speed first; or may be another local path policy that needs to be added in practical application; or may be a local path policy other than lane load and frequent lane change avoidance. The present invention is not limited thereto.

It should be understood that, throughput first is that the first roadside navigation apparatus may make a plan to enable more vehicles to travel in a lane, and speed first is that the first roadside navigation apparatus may make a plan to enable a vehicle to travel at a maximum possible speed. In practical application, if throughput first is considered, and a plan is made to enable more vehicles to travel on a road, a maximum possible speed of the vehicle is limited to some extent. Therefore, when the local path policy is used, both throughput first and speed first may be considered, or throughput first or speed first may be separately considered. This is not limited in the present invention.

Optionally, the local path policy may be carried in the local path request, for example, the local path request carries the global path and the local path policy; or the local path policy may be preset. The present invention is not limited thereto.

It should be understood that, the terminal navigation apparatus may periodically send, to the global navigation apparatus, vehicle information of a vehicle corresponding to the terminal navigation apparatus, or send, to the global navigation apparatus by using the first roadside navigation apparatus, vehicle information of a vehicle corresponding to the terminal navigation apparatus, so that the global navigation apparatus obtains the vehicle information, and monitors the vehicle in real time. The vehicle information may include current location information, current speed information, current running status information, and the like. The present invention is not limited thereto.

Optionally, the terminal navigation apparatus may send a heartbeat message to the global navigation apparatus, and add, to the heartbeat message, the vehicle information of the vehicle corresponding to the terminal navigation apparatus. Alternatively, the terminal navigation apparatus may send a heartbeat message to the global navigation apparatus by using the first roadside navigation apparatus, and add the vehicle information to the heartbeat message, so that the first roadside navigation apparatus may collect vehicle information of all vehicles in the coverage area, and then send the collected vehicle information to the global navigation apparatus together.

Optionally, in an embodiment, when the terminal navigation apparatus determines that there is a need to change the travelling path or the destination due to a reason such as a journey change or an actual road condition, the terminal navigation apparatus may send a global path change request to the global navigation apparatus. The global path change request is used to request to plan a first global path from a first start location to a first destination. The global navigation apparatus determines the first global path according to the first start location and the first destination, and sends the first global path to the terminal navigation apparatus. The first start location may usually be the current location of the terminal navigation apparatus, and the first destination may be a target destination re-determined by the terminal navigation apparatus.

Optionally, in another embodiment, when the terminal navigation apparatus determines that there is a need to change the travelling path or the destination due to a reason such as a journey change or an actual road condition, the terminal navigation apparatus may forward a global path change request to the global navigation apparatus by using the first roadside navigation apparatus. The global path change request is used to request to plan a first global path from a first start location to a first destination. The global navigation apparatus determines the first global path according to the first start location and the first destination, and forwards the first global path to the terminal navigation apparatus by using the first roadside navigation apparatus, so that the first roadside navigation apparatus determines a first local path according to the first global path. The first start location may usually be the current location of the terminal navigation apparatus, and the first destination may be a target destination re-determined by the terminal navigation apparatus.

Optionally, in an embodiment, when the global navigation apparatus determines that the travelling path of the terminal navigation apparatus deviates from the global path, or that there is temporary construction or road closure in the front of the travelling path, and the terminal navigation apparatus needs to make a detour, the global navigation apparatus may determine a second global path according to current location information of the terminal navigation apparatus, and send the second global path to the terminal navigation apparatus.

Optionally, in another embodiment, when the global navigation apparatus determines that the travelling path of the terminal navigation apparatus deviates from the global path, or that there is temporary construction or road closure in the front of the travelling path, and the terminal navigation apparatus needs to make a detour, the global navigation apparatus may forward a second global path to the terminal navigation apparatus by using the first roadside navigation apparatus, so that the first roadside navigation apparatus determines a second local path according to the second global path.

Optionally, in another embodiment, when the terminal navigation apparatus needs to actively change a travelling lane while travelling along the global path, for example, when the terminal navigation apparatus determines that there is a need to overtake actively, the terminal navigation apparatus may further send a local path change request to the first roadside navigation apparatus. The global path change request is used to request to re-determine a local path. The first roadside navigation apparatus re-determines a third local path according to current location information of the terminal navigation apparatus and the global path, and sends the third local path to the terminal navigation apparatus, so that the terminal navigation apparatus re-determines a travelling path according to the third local path and the global path. However, the present invention is not limited thereto.

Optionally, in another embodiment, when the first roadside navigation apparatus determines that lane load is unbalanced in the front of the travelling path of the terminal navigation apparatus and a lane needs to be changed, or the first roadside navigation apparatus determines that the travelling path of the terminal navigation apparatus deviates from the local path, the first roadside navigation apparatus may determine a fourth local path according to current location information of the terminal navigation apparatus, the global path, and the local path policy, and send the fourth local path to the terminal navigation apparatus.

Optionally, the terminal navigation apparatus may further autonomously plan a path. When the terminal navigation apparatus detects that an emergency occurs around the terminal navigation apparatus, for example, detects that there is an obstacle ahead or that a preceding vehicle makes emergency braking, and the terminal navigation apparatus needs to make an emergency road change or emergency braking, the terminal navigation apparatus may perform emergency path adjustment for this emergency to determine an autonomously planned path, and report this emergency and the autonomously planned path to the first roadside navigation apparatus. In addition, the terminal navigation apparatus may instruct, by means of terminal-to-terminal communication or terminal-to-infrastructure communication, surrounding terminals to make emergency avoidance. Precision of the autonomously planned path may be at a road level or a lane level, and the present invention is not limited thereto.

Optionally, in an embodiment, the terminal navigation apparatus may send a terminal registration request to the global navigation apparatus. The terminal registration request is used to request the global navigation apparatus to authenticate the terminal navigation apparatus. The global navigation apparatus sends a terminal registration acknowledgement to the terminal navigation apparatus according to the terminal registration request.

Optionally, in another embodiment, the terminal navigation apparatus may forward a terminal registration request to the global navigation apparatus by using the first roadside navigation apparatus. The terminal registration request is used to request the global navigation apparatus to authenticate the terminal navigation apparatus. The global navigation apparatus sends, by using the first roadside navigation apparatus, a terminal registration acknowledgement determined according to the terminal registration request to the terminal navigation apparatus.

For example, when the vehicle corresponding to the terminal navigation apparatus is powered on, the terminal navigation apparatus may directly send the terminal registration request to the global navigation apparatus, or forward the terminal registration request to the global navigation apparatus by using the first roadside navigation apparatus. The terminal registration request carries identification information of the terminal navigation apparatus. After receiving the terminal registration request, the global navigation apparatus performs authentication processing on the terminal navigation apparatus according to the identification information of the terminal navigation apparatus, and after authentication succeeds, sends the terminal registration acknowledgement to the terminal navigation apparatus, or forwards the terminal registration acknowledgement by using the first roadside navigation apparatus.

Optionally, the terminal navigation apparatus may receive information that is used to indicate an identifier of the first roadside navigation apparatus and that is sent by the global navigation apparatus, and determine, according to the identifier of the first roadside navigation apparatus, that the terminal navigation apparatus is in the coverage area of the first roadside navigation apparatus, so as to communicate with first roadside navigation apparatus.

Optionally, the global navigation apparatus may determine, according to location information and identification information of the terminal navigation apparatus, that the terminal navigation apparatus is in the coverage area of the first roadside navigation apparatus, and send, to the terminal navigation apparatus, information used to indicate an identifier of the first roadside navigation apparatus.

Optionally, for example, the current location information and the identification information of the terminal navigation apparatus may be carried in the terminal registration request and sent to the global navigation apparatus, or may be forwarded to the global navigation apparatus by using the first roadside navigation apparatus. This is not limited in the present invention.

Optionally, for example, the current location information and the identification information of the terminal navigation apparatus may be carried in the heartbeat message and sent to the global navigation apparatus, or may be forwarded to the global navigation apparatus by using the first roadside navigation apparatus. This is not limited in the present invention.

Optionally, the terminal navigation apparatus may detect current location information of the corresponding vehicle, or obtain current location information of the corresponding vehicle by using another detection apparatus. This is not limited in the present invention.

Optionally, identification information of the vehicle corresponding to the terminal navigation apparatus may be pre-stored in the terminal navigation apparatus, or may be obtained in another manner. For example, the identification information may be an identify (Identity, ID) or a subscriber identity module (Subscriber Identity Module, SIM) of the vehicle. This is not limited in the present invention.

Optionally, in an embodiment, the terminal navigation apparatus may send a terminal deregistration request to the global navigation apparatus. The terminal deregistration request is used to request to deregister the terminal navigation apparatus. The global navigation apparatus may clear the related information of the terminal navigation apparatus after receiving the terminal deregistration request. After completing clearing, the global navigation apparatus sends a terminal deregistration acknowledgement message to the terminal navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

Optionally, in another embodiment, the terminal navigation apparatus may forward a terminal deregistration request to the global navigation apparatus by using the first roadside navigation apparatus. The global navigation apparatus may clear the related information of the terminal navigation apparatus after receiving the terminal deregistration request. After completing clearing, the global navigation apparatus may further forward a terminal deregistration acknowledgement message to the terminal navigation apparatus by using the first roadside navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

For example, when the vehicle corresponding to the terminal navigation apparatus arrives at a travelling destination, and stops and stalls, the terminal navigation apparatus may send the terminal deregistration request to the global navigation apparatus, or forward the terminal deregistration request to the global navigation apparatus by using the first roadside navigation apparatus. The global navigation apparatus clears the stored related information of the terminal navigation apparatus after receiving the terminal deregistration request. After completing clearing, the global navigation apparatus sends the terminal deregistration acknowledgement message to the terminal navigation apparatus, or forwards the terminal deregistration acknowledgement message to the terminal navigation apparatus by using the first roadside navigation apparatus.

It should be understood that, there may be one or more driving navigation path planning processes in a period from registration to deregistration of a terminal navigation apparatus, until a vehicle finally stops and stalls. This is not limited in the present invention.

Therefore, according to the navigation method in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, navigation precision is improved, and the navigation method can be applicable to a large-scale self-driving scenario. The global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 6:
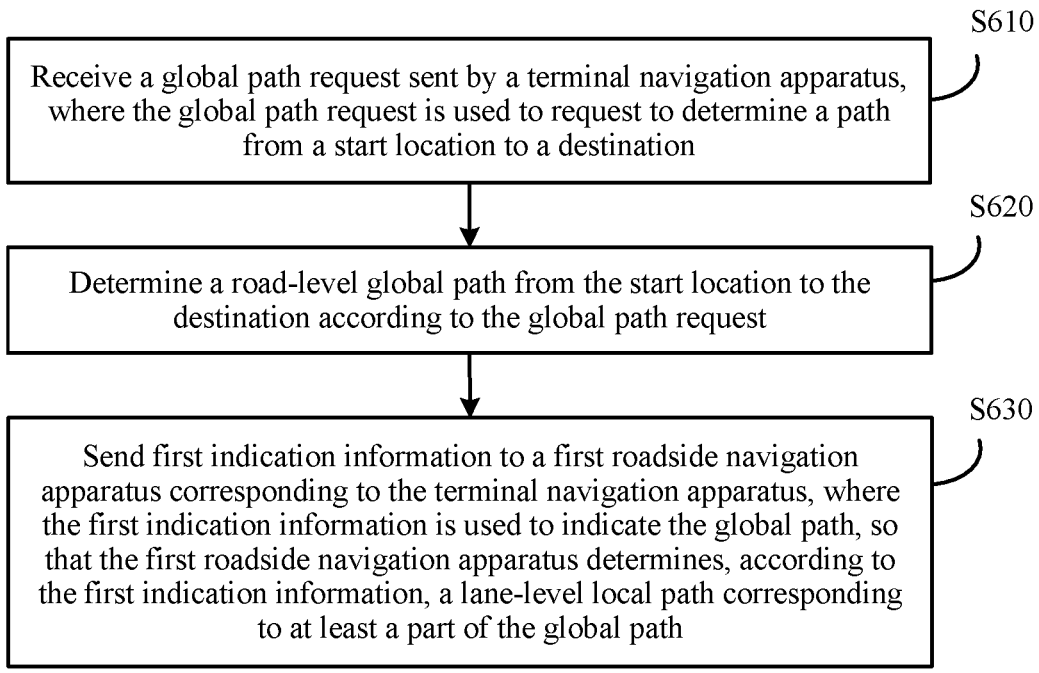
FIG. 6 is a schematic flowchart of a navigation method according to an embodiment of the present invention.

FIG. 6 is a schematic flowchart of a navigation method according to an embodiment of the present invention. For example, the method 600 may be performed by a global navigation apparatus in a navigation system. As shown in FIG. 6, the method 600 includes the following steps.

S610. Receive a global path request sent by a terminal navigation apparatus, where the global path request is used to request to determine a global path from a start location to a destination.

Optionally, the global navigation apparatus may receive the global path request that is directly sent by the terminal navigation apparatus, or the global navigation apparatus may receive the global path request that is sent by the terminal navigation apparatus by using a first roadside navigation apparatus.

S620. Determine a road-level global path from the start location to the destination according to the global path request.

S630. Send first indication information to a first roadside navigation apparatus corresponding to the terminal navigation apparatus, where the first indication information is used to indicate the global path, so that the first roadside navigation apparatus determines, according to the first indication information, a lane-level local path corresponding to at least a part of the global path.

Optionally, the global navigation apparatus may send, to the first roadside navigation apparatus corresponding to the terminal navigation apparatus, the first indication information used to indicate the global path, so that the first roadside navigation apparatus sends the first indication information to the terminal navigation apparatus; or the global navigation apparatus may directly send, to the first roadside navigation apparatus corresponding to the terminal navigation apparatus, third indication information used to indicate the global path.

It should be understood that the first indication information and the third indication information sent by the global navigation apparatus may be same information or may be different information.

Therefore, according to the navigation method in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, lane-level path planning and navigation are implemented, navigation precision is improved, and burden on a global navigation apparatus is not increased.

Optionally, the global navigation apparatus may determine the road-level global path from the start location to the destination according to all the start location, the destination, and additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the additional information may be carried in the global path request. For example, the global path request carries at least one of the global path policy information, the vehicle type information, or the driving type information; or the global path policy information may be preset. Optionally, the global navigation apparatus may pre-store or obtain, from another server, at least one of the terminal information or the driving type information. The present invention is not limited thereto.

Optionally, a global path policy may be shortest distance first, shortest time first, minimum costs first, fewest traffic lights first, or the like. The present invention is not limited thereto.

Optionally, the global path request is used to request to determine the road-level global path from the start location to the destination. The start location may be a current location of the terminal navigation apparatus, or a historical start location selected by a user from a historical start location information list on a user interface, or a specified location that is entered by a user on a user interface. The destination may be entered by a user by using a voice, or a historical destination selected from a historical destination information list, or a specified destination that is entered by a user on a user interface. The present invention is not limited thereto.

Optionally, in an embodiment, when the destination in the global path request received by the global navigation apparatus has multiple matched locations on a map, the global navigation apparatus may send information about the multiple matched locations to the terminal navigation apparatus. After determining a target destination, the terminal navigation apparatus sends information about the target destination to the global navigation apparatus, so that the global navigation apparatus determines a global path from the start location to the target destination.

Optionally, in another embodiment, when the destination in the global path request received by the global navigation apparatus has multiple matched locations on a map, the global navigation apparatus may forward information about the multiple matched locations to the terminal navigation apparatus by using the first roadside navigation apparatus. After determining a target destination, the terminal navigation apparatus forwards information about the target destination to the global navigation apparatus by using the first roadside navigation apparatus, so that the global navigation apparatus determines a global path from the start location to the target destination.

For example, the user sets a destination to a university A. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination.

It should be understood that, the terminal navigation apparatus may periodically send, to the global navigation apparatus, vehicle information of the vehicle corresponding to the terminal navigation apparatus, or send, to the global navigation apparatus by using the first roadside navigation apparatus, vehicle information of the vehicle corresponding to the terminal navigation apparatus, so that the global navigation apparatus obtains the vehicle information, and monitors the vehicle in real time. The vehicle information may include current location information, current speed information, current running status information, and the like. The present invention is not limited thereto.

Optionally, the terminal navigation apparatus may send a heartbeat message to the global navigation apparatus, and add, to the heartbeat message, the vehicle information of the vehicle corresponding to the terminal navigation apparatus. Alternatively, the terminal navigation apparatus may send a heartbeat message to the global navigation apparatus by using the first roadside navigation apparatus, and add the vehicle information to the heartbeat message, so that the first roadside navigation apparatus may collect vehicle information of all vehicles in a coverage area, and then send the collected vehicle information to the global navigation apparatus together.

Optionally, in an embodiment, when the terminal navigation apparatus determines that there is a need to change a travelling path or the destination due to a reason such as a journey change or an actual road condition, the terminal navigation apparatus may send a global path change request to the global navigation apparatus. The global path change request is used to request to plan a first global path from a first start location to a first destination. The global navigation apparatus determines the first global path according to the first start location and the first destination, and sends the first global path to the terminal navigation apparatus. The first start location may usually be the current location of the terminal navigation apparatus, and the first destination may be a target destination re-determined by the terminal navigation apparatus.

Optionally, in another embodiment, when the terminal navigation apparatus determines that there is a need to change a travelling path or the destination due to a reason such as a journey change or an actual road condition, the terminal navigation apparatus may forward a global path change request to the global navigation apparatus by using the first roadside navigation apparatus. The global path change request is used to request to plan a first global path from a first start location to a first destination. The global navigation apparatus determines the first global path according to the first start location and the first destination, and forwards the first global path to the terminal navigation apparatus by using the first roadside navigation apparatus, so that the first roadside navigation apparatus determines a first local path according to the first global path. The first start location may usually be the current location of the terminal navigation apparatus, and the first destination may be a target destination re-determined by the terminal navigation apparatus.

Optionally, in an embodiment, when the global navigation apparatus determines that a travelling path of the terminal navigation apparatus deviates from the global path, or that there is temporary construction or road closure in the front of a travelling path, and the terminal navigation apparatus needs to make a detour, the global navigation apparatus may determine a second global path according to current location information of the terminal navigation apparatus, and send the second global path to the terminal navigation apparatus.

Optionally, in another embodiment, when the global navigation apparatus determines that a travelling path of the terminal navigation apparatus deviates from the global path, or that there is temporary construction or road closure in the front of a travelling path, and the terminal navigation apparatus needs to make a detour, the global navigation apparatus may forward a second global path to the terminal navigation apparatus by using the first roadside navigation apparatus, so that the first roadside navigation apparatus determines a second local path according to the second global path.

Optionally, in another embodiment, when the terminal navigation apparatus needs to actively change a travelling lane while travelling along the global path, for example, when the terminal navigation apparatus determines that there is a need to overtake actively, the terminal navigation apparatus may further send a local path change request to the first roadside navigation apparatus. The global path change request is used to request to re-determine a local path. The first roadside navigation apparatus re-determines a third local path according to current location information of the terminal navigation apparatus and the global path, and sends the third local path to the terminal navigation apparatus, so that the terminal navigation apparatus re-determines a travelling path according to the third local path and the global path. However, the present invention is not limited thereto.

Optionally, in an embodiment, the terminal navigation apparatus may send a terminal registration request to the global navigation apparatus. The terminal registration request is used to request the global navigation apparatus to authenticate the terminal navigation apparatus. The global navigation apparatus sends a terminal registration acknowledgement to the terminal navigation apparatus according to the terminal registration request.

Optionally, in another embodiment, the terminal navigation apparatus may forward a terminal registration request to the global navigation apparatus by using the first roadside navigation apparatus. The terminal registration request is used to request the global navigation apparatus to authenticate the terminal navigation apparatus. The global navigation apparatus sends, by using the first roadside navigation apparatus, a terminal registration acknowledgement determined according to the terminal registration request to the terminal navigation apparatus.

For example, when the vehicle corresponding to the terminal navigation apparatus is powered on, the terminal navigation apparatus may directly send the terminal registration request to the global navigation apparatus, or forward the terminal registration request to the global navigation apparatus by using the first roadside navigation apparatus. The terminal registration request carries identification information of the terminal navigation apparatus. After receiving the terminal registration request, the global navigation apparatus performs authentication processing on the terminal navigation apparatus according to the identification information of the terminal navigation apparatus, and after authentication succeeds, sends the terminal registration acknowledgement to the terminal navigation apparatus, or forwards the terminal registration acknowledgement by using the first roadside navigation apparatus.

Optionally, the terminal navigation apparatus may receive information that is used to indicate an identifier of the first roadside navigation apparatus and that is sent by the global navigation apparatus, and determine, according to the identifier of the first roadside navigation apparatus, that the terminal navigation apparatus is in the coverage area of the first roadside navigation apparatus, so as to communicate with first roadside navigation apparatus.

Optionally, the global navigation apparatus may determine, according to location information and identification information of the terminal navigation apparatus, that the terminal navigation apparatus is in the coverage area of the first roadside navigation apparatus, and send, to the terminal navigation apparatus, information used to indicate an identifier of the first roadside navigation apparatus.

Optionally, for example, the current location information and the identification information of the terminal navigation apparatus may be carried in the terminal registration request and sent to the global navigation apparatus, or may be forwarded to the global navigation apparatus by using the first roadside navigation apparatus. This is not limited in the present invention.

Optionally, for example, the current location information and the identification information of the terminal navigation apparatus may be carried in the heartbeat message and sent to the global navigation apparatus, or may be forwarded to the global navigation apparatus by using the first roadside navigation apparatus. This is not limited in the present invention.

Optionally, the terminal navigation apparatus may detect current location information of the corresponding vehicle, or obtain current location information of the corresponding vehicle by using another detection apparatus. This is not limited in the present invention.

Optionally, identification information of the vehicle corresponding to the terminal navigation apparatus may be pre-stored in the terminal navigation apparatus, or may be obtained in another manner. For example, the identification information may be an identify (Identity, ID) or a subscriber identity module (Subscriber Identity Module, SIM) of the vehicle. This is not limited in the present invention.

Optionally, in an embodiment, during construction of the navigation system in this embodiment of the present invention, the first roadside navigation apparatus may send a first roadside navigation registration request to the global navigation apparatus. The first roadside navigation registration request is used to request to activate the first roadside navigation apparatus. The first roadside navigation registration request may carry the identification information of the first roadside navigation apparatus, so that the global navigation apparatus monitors a running status of the first roadside navigation apparatus according to the identification information of the first roadside navigation apparatus. The present invention is not limited thereto.

Optionally, when the first roadside navigation apparatus determines that there is a need to stop a local path planning service, the first roadside navigation apparatus may send a first roadside navigation deregistration request to the global navigation apparatus. The first roadside navigation deregistration request is used to request to deactivate the first roadside navigation apparatus. The first roadside navigation registration request may carry the identification information of the first roadside navigation apparatus. The global navigation apparatus may deactivate the first roadside navigation apparatus according to the identification information of the first roadside navigation apparatus, and send a roadside navigation deregistration acknowledgement message to the first roadside navigation apparatus. The first roadside navigation apparatus exits the local path planning service, and clears related information, except necessary vehicle information stored in a log, that is of the terminal navigation apparatus and that is stored in the first roadside navigation apparatus, for example, the related information may be the global path determined by the global navigation apparatus and the vehicle information of the vehicle corresponding to the terminal navigation apparatus in this embodiment of the present invention. This is not limited in the present invention.

Optionally, in an embodiment, the terminal navigation apparatus may send a terminal deregistration request to the global navigation apparatus. The terminal deregistration request is used to request to deregister the terminal navigation apparatus. The global navigation apparatus may clear the related information of the terminal navigation apparatus after receiving the terminal deregistration request. After completing clearing, the global navigation apparatus sends a terminal deregistration acknowledgement message to the terminal navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

Optionally, in another embodiment, the terminal navigation apparatus may forward a terminal deregistration request to the global navigation apparatus by using the first roadside navigation apparatus. The global navigation apparatus may clear the related information of the terminal navigation apparatus after receiving the terminal deregistration request. After completing clearing, the global navigation apparatus may further forward a terminal deregistration acknowledgement message to the terminal navigation apparatus by using the first roadside navigation apparatus. For example, the related information of the terminal navigation apparatus may be the global path determined by the global navigation apparatus and the vehicle information of the vehicle corresponding to the terminal navigation apparatus in this embodiment of the present invention. This is not limited in the present invention.

For example, when the vehicle corresponding to the terminal navigation apparatus arrives at a travelling destination, and stops and stalls, the terminal navigation apparatus may send the terminal deregistration request to the global navigation apparatus, or forward the terminal deregistration request to the global navigation apparatus by using the first roadside navigation apparatus. The global navigation apparatus clears the stored related information of the terminal navigation apparatus after receiving the terminal deregistration request. After completing clearing, the global navigation apparatus sends the terminal deregistration acknowledgement message to the terminal navigation apparatus, or forwards the terminal deregistration acknowledgement message to the terminal navigation apparatus by using the first roadside navigation apparatus.

It should be understood that, there may be one or more driving navigation path planning processes in a period from registration to deregistration of a terminal navigation apparatus, until a vehicle finally stops and stalls. This is not limited in the present invention.

Therefore, according to the navigation method in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, navigation precision is improved, and the navigation method can be applicable to a large-scale self-driving scenario. A global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

The navigation method in the embodiments of the present invention is described above with reference to FIG. 4 to FIG. 6. The navigation method in the embodiments of the present invention is described below with reference to specific examples in FIG. 7A and FIG. 7B and FIG. 8A and FIG. 8B. It should be noted that these examples are merely intended to help a person skilled in the art understand and implement the embodiments of the present invention, but are not intended to limit the scope of the embodiments of the present invention. A person skilled in the art may make equivalent changes or modifications to the examples given herein, and such changes or modifications shall still fall within the scope of the embodiments of the present invention.

Figure 7A:
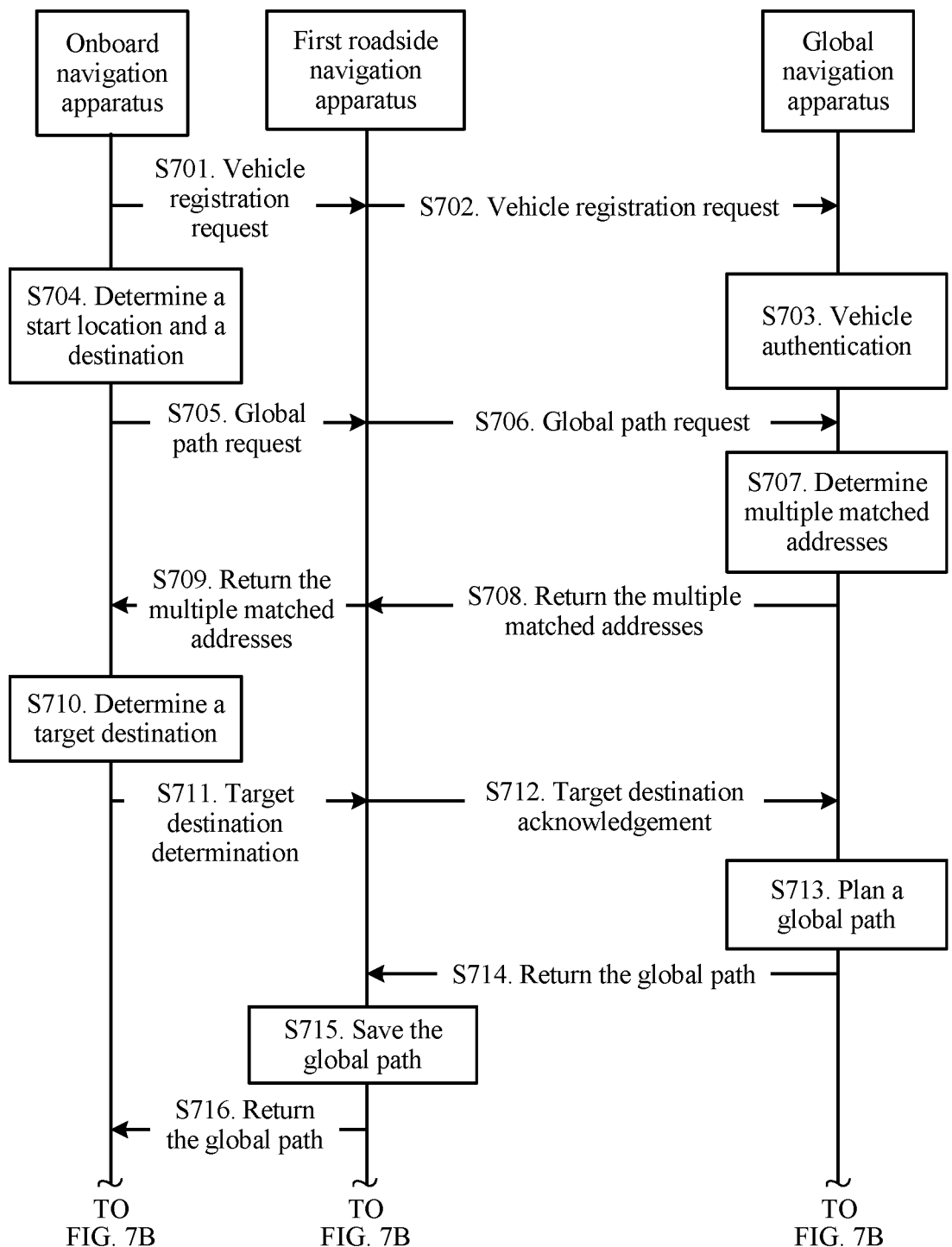
FIG. 7A and FIG. 7B are a schematic flowchart of a navigation method according to an embodiment of the present invention.
Figure 7B:
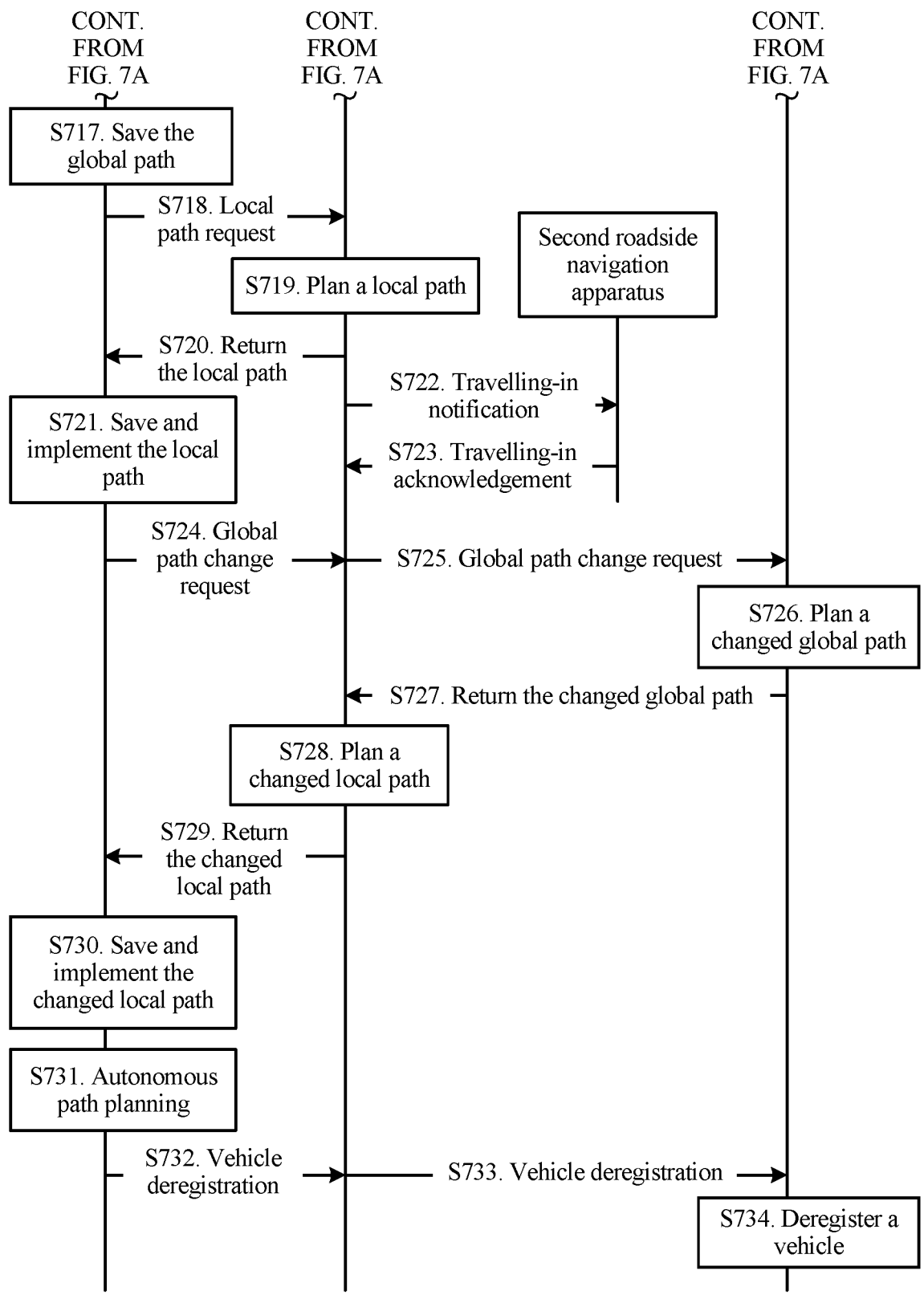

FIG. 7A and FIG. 7B are a schematic flowchart of a navigation method according to an embodiment of the present invention. The navigation method may be performed by a system that includes a global navigation apparatus, a first roadside navigation apparatus, a second roadside navigation apparatus, and an onboard navigation apparatus. For example, the onboard navigation apparatus may be a terminal navigation apparatus, and the onboard navigation apparatus is integrated in a vehicle.

S701. The onboard navigation apparatus may send a terminal registration request to the first roadside navigation apparatus, where the terminal registration request is used to request the global navigation apparatus to authenticate the onboard navigation apparatus.

S702. The first roadside navigation apparatus forwards the terminal registration request to the global navigation apparatus.

S703. The global navigation apparatus may perform, according to identification information of a vehicle corresponding to the onboard navigation apparatus, authentication processing on the vehicle.

Optionally, for example, identification information of the onboard navigation apparatus may be carried in a terminal registration request, or may be carried in a heartbeat message. This is not limited in the present invention.

S704. The onboard navigation apparatus determines a start location and a destination of navigation.

S705. The onboard navigation apparatus sends a global path request to the first roadside navigation apparatus, where the global path request is used to request to determine a global path from the start location to the destination.

S706. The first roadside navigation apparatus forwards the global path request to the global navigation apparatus.

S707. The global navigation apparatus determines that the destination in the received global path request has multiple matched locations.

For example, a user sets a destination to a university A in the onboard navigation apparatus. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination.

S708. The global navigation apparatus may send information about the multiple matched locations to the first roadside navigation apparatus.

S709. The first roadside navigation apparatus forwards the information about the multiple matched addresses to the onboard navigation apparatus.

S710. The onboard navigation apparatus determines a unique target destination.

S711. The onboard navigation apparatus sends information about the target destination to the first roadside navigation apparatus.

S712. The first roadside navigation apparatus forwards the information about the target destination to the global navigation apparatus.

S713. The global navigation apparatus determines the global path according to the start location and the target destination.

Optionally, the global navigation apparatus may determine a road-level global path from the start location to the destination according to all the start location, the destination, and additional information. The additional information includes at least one of the following information: current road condition information, global path policy information, vehicle type information of the vehicle corresponding to the onboard navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the onboard navigation apparatus may be a vehicle in which the onboard navigation apparatus is located.

Optionally, the additional information may be carried in the global path request. For example, the global path request carries at least one of the global path policy information, onboard information, or the driving type information; or the global path policy information may be preset. Optionally, the global navigation apparatus may pre-store or obtain, from another server, at least one of the onboard information or the driving type information. The present invention is not limited thereto.

Optionally, a global path policy may be shortest distance first, shortest time first, minimum costs first, fewest traffic lights first, or the like. The present invention is not limited thereto.

S714. The global navigation apparatus sends, to the first roadside navigation apparatus, first indication information used to indicate the global path.

S715. The first roadside navigation apparatus saves the global path.

S716. The first roadside navigation apparatus forwards the first indication information to the onboard navigation apparatus.

S717. The onboard navigation apparatus saves the global path, so that the onboard navigation apparatus determines a travelling path according to the global path.

S718. The onboard navigation apparatus sends a local path request to the first roadside navigation apparatus, where the local path request is used to request to determine a lane-level local path corresponding to at least a part of the global path.

S719. The first roadside navigation apparatus determines the local path according to the global path.

Optionally, information about the global path may be saved by the first roadside navigation apparatus in S713, or may be carried in the local path request, or may be carried in the first indication information sent by the global navigation apparatus.

Optionally, the first roadside navigation apparatus may determine, according to both the global path and a local path policy, the lane-level local path corresponding to the at least a part of the global path. The local path policy may be at least one of the following information: lane load balancing, frequent lane change avoidance, throughput first, or speed first; or may be another local path policy that needs to be added in practical application; or may be a local path policy other than lane load and frequent lane change avoidance. The present invention is not limited thereto.

It should be understood that, throughput first is that the first roadside navigation apparatus may make a plan to enable more vehicles to travel in a lane, and speed first is that the first roadside navigation apparatus may make a plan to enable a vehicle to travel at a maximum possible speed. In practical application, if throughput first is considered, and a plan is made to enable more vehicles to travel on a road, a maximum possible speed of the vehicle is limited to some extent. Therefore, when the local path policy is used, both throughput first and speed first may be considered, or throughput first or speed first may be separately considered. This is not limited in the present invention.

Optionally, the local path policy may be carried in the local path request, for example, the local path request carries the global path and the local path policy; or the local path policy may be preset. The present invention is not limited thereto.

S720. The first roadside navigation apparatus sends, to the onboard navigation apparatus, second indication information used to indicate the local path.

S721. The onboard navigation apparatus saves the local path, and determines the travelling path according to at least one of the global path or the local path.

S722. When the onboard navigation apparatus is about to travel into a coverage area of the second roadside navigation apparatus from a coverage area of the first roadside navigation apparatus, the first roadside navigation apparatus may send a travelling-in notification message to the second roadside navigation apparatus, where the travelling-in notification message carries information about the global path, so that the second roadside navigation apparatus determines the local path according to the global path.

S723. When the onboard navigation apparatus has travelled into the coverage area of the second roadside navigation apparatus, the second roadside navigation apparatus may send a travelling-in acknowledgement message to the first roadside navigation apparatus, where the travelling-in acknowledgement message is used to acknowledge that the onboard navigation apparatus has entered the coverage area of the second roadside navigation apparatus.

Optionally, the travelling-in notification message may be sent to the second roadside navigation apparatus when the onboard navigation apparatus is about to travel out of the coverage area of the first roadside navigation apparatus, or may be sent to the second roadside navigation apparatus when the onboard navigation apparatus just travels into the first roadside navigation apparatus, so that the second roadside navigation apparatus has sufficient time to determine, for the onboard navigation apparatus, a local path in the coverage area of the second roadside navigation apparatus. The present invention is not limited thereto.

S724. When the onboard navigation apparatus determines that there is a need to change the travelling path or the destination due to a reason such as a journey change or an actual road condition, the onboard navigation apparatus may send a global path change request to the first roadside navigation apparatus, where the global path change request is used to request to replan a changed global path, the first start location may usually be a current location of the onboard navigation apparatus, and the first destination may be a target destination re-determined by the onboard navigation apparatus.

S725. The first roadside navigation apparatus forwards the global path change request to the global navigation apparatus.

S726. The global navigation apparatus determines the changed global path according to the start location and the changed destination.

S727. The global navigation apparatus sends, to the first roadside navigation apparatus, third indication information used to indicate the changed global path.

S728. The first roadside navigation apparatus determines a changed local path according to the changed global path.

S729. The first roadside navigation apparatus sends the changed local path to the onboard navigation apparatus.

S730. The onboard navigation apparatus saves and implements the changed local path.

S731. The onboard navigation apparatus may further autonomously plan a path.

Optionally, when the onboard navigation apparatus detects that an emergency occurs around the onboard navigation apparatus, for example, detects that there is an obstacle ahead or that a preceding vehicle makes emergency braking, and the onboard navigation apparatus needs to make an emergency road change or emergency braking, the onboard navigation apparatus may perform emergency path adjustment for this emergency to determine an autonomously planned path, and report this emergency and the autonomously planned path to the first roadside navigation apparatus. In addition, the onboard navigation apparatus may instruct, by means of terminal-to-terminal communication or terminal-to-infrastructure communication, surrounding terminals to make emergency avoidance. Precision of the autonomously planned path may be at a road level or a lane level, and the present invention is not limited thereto.

S732. The onboard navigation apparatus may send a terminal deregistration request to the first roadside navigation apparatus.

S733. The first roadside navigation apparatus forwards the terminal deregistration request to the global navigation apparatus.

S734. The global navigation apparatus clears related information of the onboard navigation apparatus.

Optionally, for example, the related information of the onboard navigation apparatus may be the global path determined by the global navigation apparatus and vehicle information of the vehicle corresponding to the onboard navigation apparatus. This is not limited in the present invention.

For example, when the vehicle corresponding to the onboard navigation apparatus arrives at a travelling destination, and stops and stalls, the onboard navigation apparatus may send an onboard registration request to the first roadside navigation apparatus. The global navigation apparatus clears the stored related information of the onboard navigation apparatus after receiving the terminal deregistration request. After completing clearing, the global navigation apparatus sends a terminal deregistration acknowledgement message to the onboard navigation apparatus, or forwards the terminal deregistration acknowledgement message to the onboard navigation apparatus by using the first roadside navigation apparatus. For example, the related information of the onboard navigation apparatus may be the global path determined by the global navigation apparatus and the vehicle information of the vehicle corresponding to the onboard navigation apparatus. This is not limited in the present invention.

It should be understood that, there may be one or more driving navigation path planning processes in a period from registration to deregistration of an onboard navigation apparatus, until a vehicle finally stops and stalls. This is not limited in the present invention.

Therefore, a navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, navigation precision is improved, and the navigation system can be applicable to a large-scale self-driving scenario. The global navigation apparatus distributes massive lane-level path navigation services to multiple roadside navigation apparatuses, and a failure of a single roadside navigation apparatus does not cause breakdown of the entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 8A:
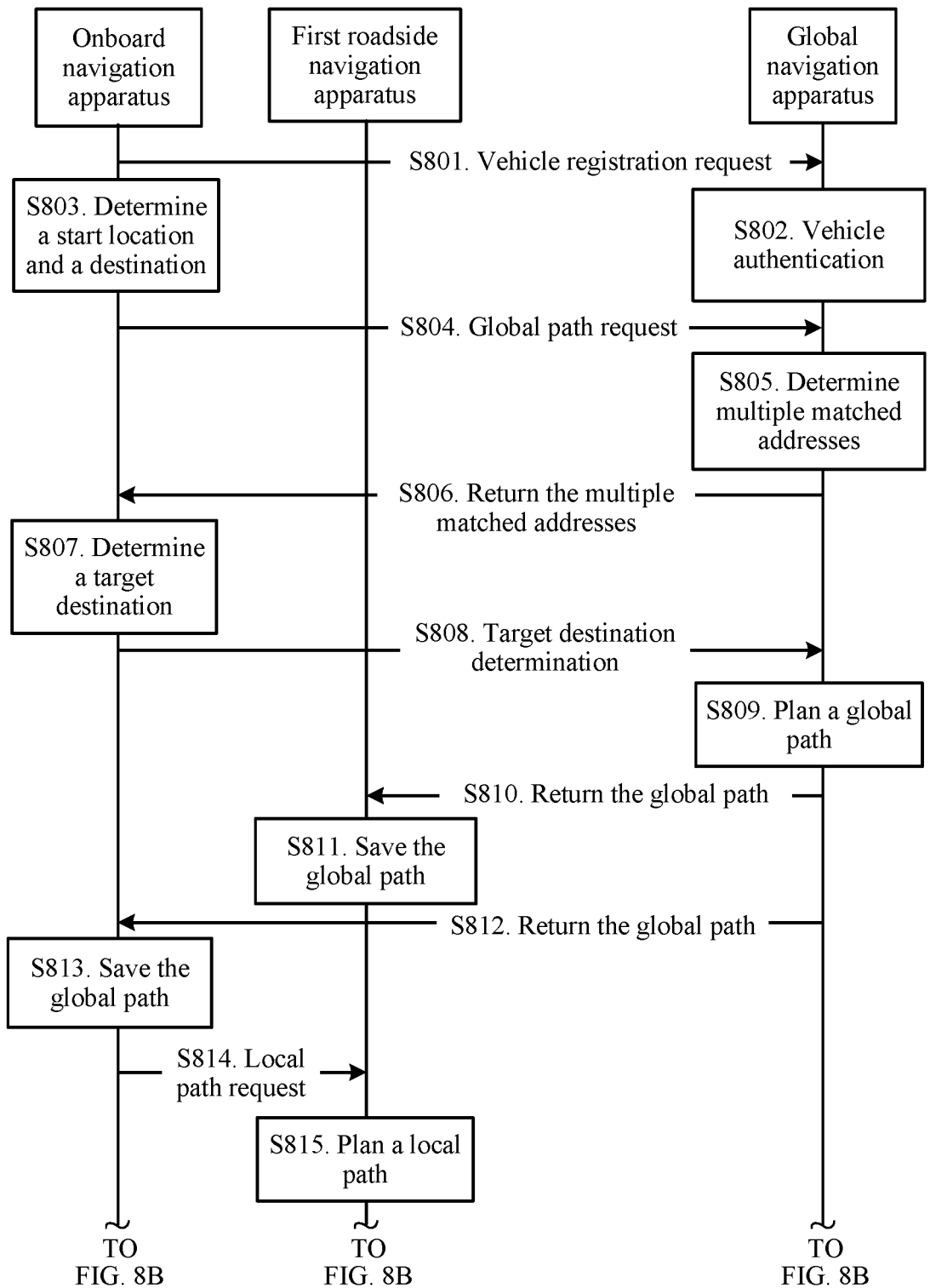
FIG. 8A and FIG. 8B are a schematic flowchart of a navigation method according to an embodiment of the present invention.
Figure 8B:
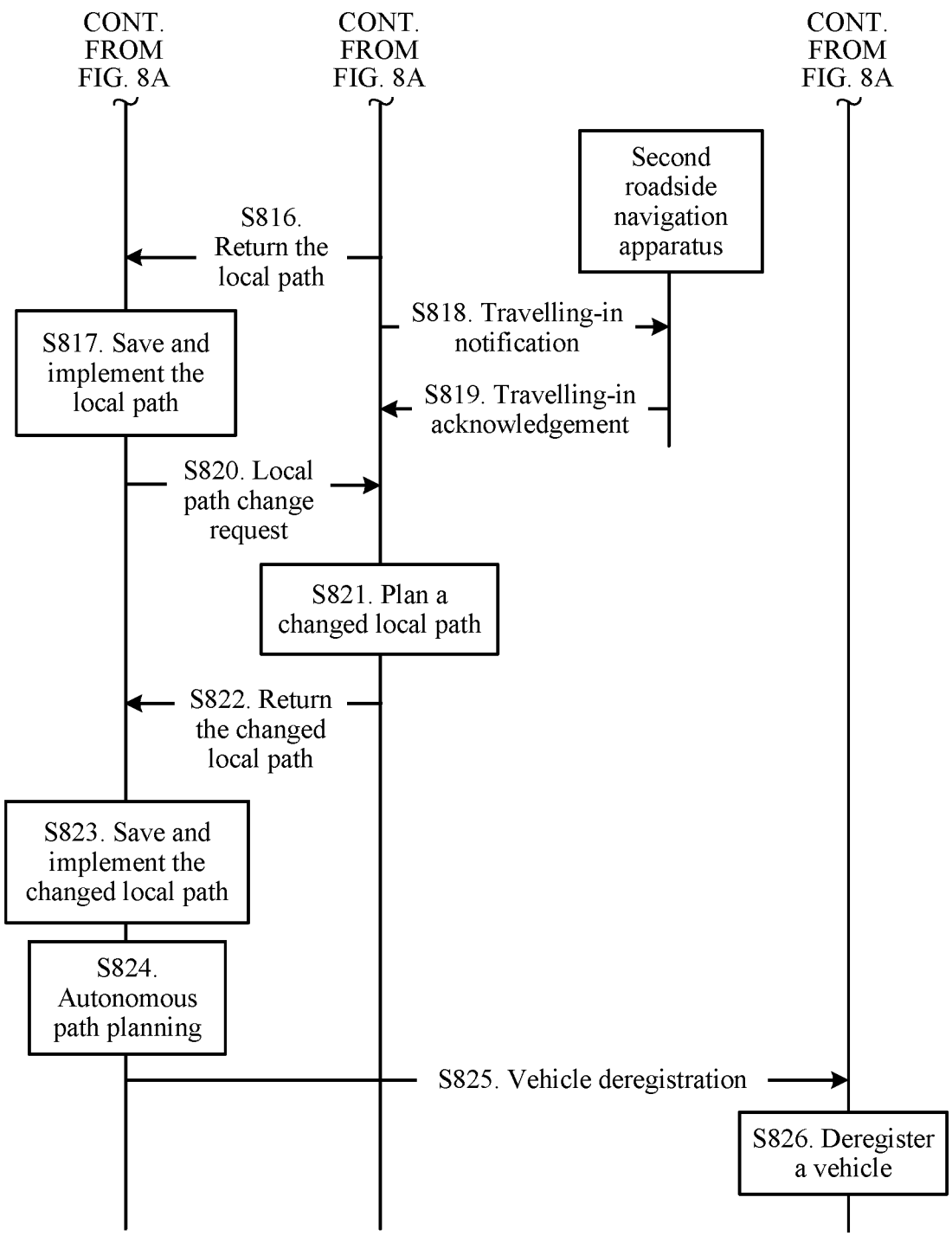

FIG. 8A and FIG. 8B are a schematic flowchart of a navigation method according to an embodiment of the present invention. The navigation method may be performed by a system that includes a global navigation apparatus, a first roadside navigation apparatus, a second roadside navigation apparatus, and a terminal navigation apparatus. For example, the terminal navigation apparatus may be an onboard navigation apparatus, and the onboard navigation apparatus is integrated in a vehicle.

For ease and brevity of description, for implementations of specific steps in a navigation procedure in this embodiment, refer to corresponding processes in the navigation method embodiments in FIG. 4 to FIG. 8A and FIG. 8B. Details are not described herein again. As shown in FIG. 8A and FIG. 8B, the procedure includes the following steps.

S801. The onboard navigation apparatus may send a terminal registration request to the global navigation apparatus by using the first roadside navigation apparatus, where the terminal registration request is used to request the global navigation apparatus to authenticate the onboard navigation apparatus.

S802. The global navigation apparatus may perform, according to identification information of a vehicle corresponding to the onboard navigation apparatus, authentication processing on the vehicle.

Optionally, for example, identification information of the onboard navigation apparatus may be carried in a terminal registration request, or may be carried in a heartbeat message. This is not limited in the present invention.

S803. The onboard navigation apparatus determines a start location and a destination of navigation.

S804. The onboard navigation apparatus sends a global path request to the global navigation apparatus by using the first roadside navigation apparatus, where the global path request is used to request to determine a global path from the start location to the destination.

S805. The global navigation apparatus determines that the destination in the received global path request has multiple matched locations.

For example, a user sets a destination to a university A in the onboard navigation apparatus. There may be multiple matched addresses on a map: a south gate of the university A, a north gate of the university A, a teaching building of the university A, and the like. The global navigation apparatus needs to know which one of these matched addresses is a target destination, and then can determine a global path according to a start location and the target destination.

S806. The global navigation apparatus may send information about the multiple matched locations to the onboard navigation apparatus by using the first roadside navigation apparatus.

S807. The onboard navigation apparatus determines a unique target destination.

S808. The onboard navigation apparatus forwards information about the target destination to the global navigation apparatus by using the first roadside navigation apparatus.

S809. The global navigation apparatus determines the global path according to the start location and the target destination.

Optionally, the global navigation apparatus may determine a road-level global path from the start location to the destination according to all the start location, the destination, and additional information. The additional information includes at least one of the following information: current road condition information, global path policy information, vehicle type information of the vehicle corresponding to the onboard navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the onboard navigation apparatus may be a vehicle in which the onboard navigation apparatus is located.

Optionally, the additional information may be carried in the global path request. For example, the global path request carries at least one of the global path policy information, onboard information, or the driving type information; or the global path policy information may be preset. Optionally, the global navigation apparatus may pre-store or obtain, from another server, at least one of the onboard information or the driving type information. The present invention is not limited thereto.

Optionally, a global path policy may be shortest distance first, shortest time first, minimum costs first, fewest traffic lights first, or the like. The present invention is not limited thereto.

S810. The global navigation apparatus sends, to the first roadside navigation apparatus, first indication information used to indicate the global path.

S811. The first roadside navigation apparatus saves the global path.

S812. The global navigation apparatus sends, to the onboard navigation apparatus, the first indication information used to indicate the global path.

S813. The onboard navigation apparatus saves the global path, so that the onboard navigation apparatus determines a travelling path according to the global path.

S814. The onboard navigation apparatus sends a local path request to the first roadside navigation apparatus, where the local path request is used to request to determine a lane-level local path corresponding to at least a part of the global path.

S815. The first roadside navigation apparatus determines the local path according to the global path.

Optionally, information about the global path may be saved by the first roadside navigation apparatus in S813, or may be carried in the local path request, or may be carried in the first indication information sent by the global navigation apparatus.

Optionally, the first roadside navigation apparatus may determine, according to both the global path and a local path policy, the lane-level local path corresponding to the at least a part of the global path. The local path policy may be at least one of the following information: lane load balancing, frequent lane change avoidance, throughput first, or speed first; or may be another local path policy that needs to be added in practical application; or may be a local path policy other than lane load and frequent lane change avoidance. The present invention is not limited thereto.

It should be understood that, throughput first is that the first roadside navigation apparatus may make a plan to enable more vehicles to travel in a lane, and speed first is that the first roadside navigation apparatus may make a plan to enable a vehicle to travel at a maximum possible speed. In practical application, if throughput first is considered, and a plan is made to enable more vehicles to travel on a road, a maximum possible speed of the vehicle is limited to some extent. Therefore, when the local path policy is used, both throughput first and speed first may be considered, or throughput first or speed first may be separately considered. This is not limited in the present invention.

Optionally, the local path policy may be carried in the local path request, for example, the local path request carries the global path and the local path policy; or the local path policy may be preset. The present invention is not limited thereto.

S816. The first roadside navigation apparatus sends, to the onboard navigation apparatus, second indication information used to indicate the local path.

S817. The onboard navigation apparatus saves the local path, and determines the travelling path according to at least one of the global path or the local path.

S818. When the onboard navigation apparatus is about to travel into a coverage area of the second roadside navigation apparatus from a coverage area of the first roadside navigation apparatus, the first roadside navigation apparatus may send a travelling-in notification message to the second roadside navigation apparatus, where the travelling-in notification message carries information about the global path, so that the second roadside navigation apparatus determines the local path according to the global path.

S819. When the onboard navigation apparatus has travelled into the coverage area of the second roadside navigation apparatus, the second roadside navigation apparatus may send a travelling-in acknowledgement message to the first roadside navigation apparatus, where the travelling-in acknowledgement message is used to acknowledge that the onboard navigation apparatus has entered the coverage area of the second roadside navigation apparatus.

Optionally, the travelling-in notification message may be sent to the second roadside navigation apparatus when the onboard navigation apparatus is about to travel out of the coverage area of the first roadside navigation apparatus, or may be sent to the second roadside navigation apparatus when the onboard navigation apparatus just travels into the first roadside navigation apparatus, so that the second roadside navigation apparatus has sufficient time to determine, for the onboard navigation apparatus, a local path in the coverage area of the second roadside navigation apparatus. The present invention is not limited thereto.

S820. When the onboard navigation apparatus needs to actively change a travelling lane while travelling along the global path, for example, when the onboard navigation apparatus determines that there is a need to overtake actively, the onboard navigation apparatus may further send a local path change request to the first roadside navigation apparatus, where the global path change request is used to request to re-determine a local path.

S821. The first roadside navigation apparatus re-determines a changed local path according to current location information of the onboard navigation apparatus and the global path.

Optionally, for example, the current location information and the identification information of the onboard navigation apparatus may be carried in the local path change request and sent to the first roadside navigation apparatus. This is not limited in the present invention.

Optionally, for example, the current location information and the identification information of the onboard navigation apparatus may be carried in the heartbeat message and sent to the first roadside navigation apparatus. This is not limited in the present invention.

S822. The first roadside navigation apparatus sends, to the onboard navigation apparatus, third indication information used to indicate the changed local path.

S823. The onboard navigation apparatus saves and implements the changed local path.

S824. The onboard navigation apparatus may further autonomously plan a path.

Optionally, when the onboard navigation apparatus detects that an emergency occurs around the onboard navigation apparatus, for example, detects that there is an obstacle ahead or that a preceding vehicle makes emergency braking, and the onboard navigation apparatus needs to make an emergency road change or emergency braking, the onboard navigation apparatus may perform emergency path adjustment for this emergency to determine an autonomously planned path, and report this emergency and the autonomously planned path to the first roadside navigation apparatus. In addition, the onboard navigation apparatus may instruct, by means of terminal-to-terminal communication or terminal-to-infrastructure communication, surrounding terminals to make emergency avoidance. Precision of the autonomously planned path may be at a road level or a lane level, and the present invention is not limited thereto.

S825. The onboard navigation apparatus may send a terminal deregistration request to the global navigation apparatus.

S826. The global navigation apparatus clears related information of the onboard navigation apparatus.

Optionally, for example, the related information of the onboard navigation apparatus may be the global path determined by the global navigation apparatus and vehicle information of the vehicle corresponding to the onboard navigation apparatus. This is not limited in the present invention.

For example, when the vehicle corresponding to the onboard navigation apparatus arrives at a travelling destination, and stops and stalls, the onboard navigation apparatus may send an onboard registration request to the first roadside navigation apparatus. The global navigation apparatus clears the stored related information of the onboard navigation apparatus after receiving the terminal deregistration request. After completing clearing, the global navigation apparatus sends a terminal deregistration acknowledgement message to the onboard navigation apparatus, or forwards the terminal deregistration acknowledgement message to the onboard navigation apparatus by using the first roadside navigation apparatus. For example, the related information of the onboard navigation apparatus may be the global path determined by the global navigation apparatus and the vehicle information of the vehicle corresponding to the onboard navigation apparatus. This is not limited in the present invention.

It should be understood that, there may be one or more driving navigation path planning processes in a period from registration to deregistration of an onboard navigation apparatus, until a vehicle finally stops and stalls. This is not limited in the present invention.

A navigation system in this embodiment of the present invention includes a global navigation apparatus, a first roadside navigation apparatus, and a terminal navigation apparatus. The global navigation apparatus determines a road-level global path according to a global path request sent by the terminal navigation apparatus. The first roadside navigation apparatus determines, according to the global path, a lane-level local path corresponding to at least a part of the global path. The terminal navigation apparatus determines a travelling path according to at least one of the global path or the local path. Therefore, navigation precision is improved, and the navigation system can be applicable to a large-scale self-driving scenario. The global navigation apparatus distributes massive lane-level path navigation services to multiple roadside navigation apparatuses, and a failure of a single roadside navigation apparatus does not cause breakdown of the entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and an onboard navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

The navigation method in the embodiments of the present invention is described above with reference to FIG. 7A and FIG. 7B and FIG. 8A and FIG. 8B. A roadside navigation apparatus, a terminal navigation apparatus, and a global navigation apparatus in the embodiments of the present invention are described below with reference to specific examples in FIG. 9 to FIG. 14. It should be noted that these examples are merely intended to help a person skilled in the art understand and implement the embodiments of the present invention, but are not intended to limit the scope of the embodiments of the present invention. A person skilled in the art may make equivalent changes or modifications to the examples given herein, and such changes or modifications shall still fall within the scope of the embodiments of the present invention.

It should be understood that the roadside navigation apparatus, the terminal navigation apparatus, and the global navigation apparatus in the embodiments of the present invention that are described in FIG. 9 to FIG. 14 can implement the steps in the methods in FIG. 4 to FIG. 6. To avoid repetition, details are not described herein.

Figure 9:
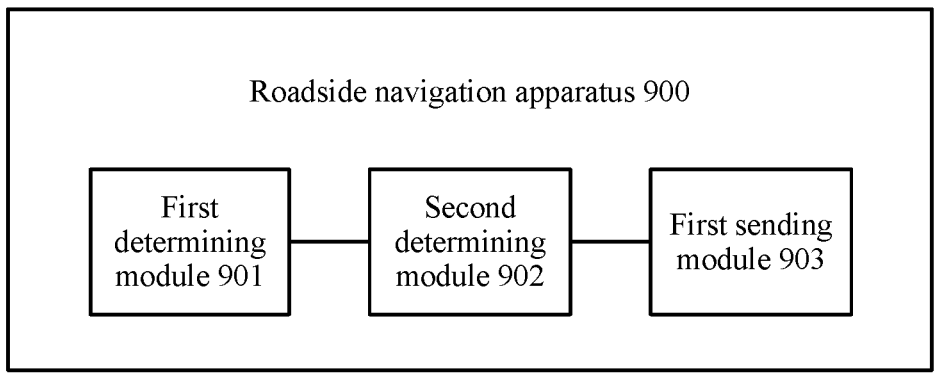
FIG. 9 is a schematic block diagram of a roadside navigation apparatus according to an embodiment of the present invention.

FIG. 9 is a schematic block diagram of a roadside navigation apparatus according to an embodiment of the present invention. As shown in FIG. 9, the roadside navigation apparatus 900 includes:

a first determining module 901, configured to determine a road-level global path from a start location to a destination;

a second determining module 902, configured to determine, according to the global path determined by the first determining module 901, a lane-level local path corresponding to at least a part of the global path; and a first sending module 903, configured to send second indication information to a terminal navigation apparatus, where the second indication information is used to indicate the local path determined by the second determining module 902.

Therefore, according to the roadside navigation apparatus in this embodiment of the present invention, a road-level global path from a start location to a destination is determined, a lane-level local path corresponding to at least a part of the global path is determined according to the global path, and second indication information used to indicate the local path is sent to the terminal navigation apparatus. Therefore, lane-level path planning and navigation are implemented, navigation precision is improved, and burden on a global navigation apparatus is not increased.

Optionally, in an embodiment, the first determining module 901 is specifically configured to: receive first indication information sent by the global navigation apparatus, where the first indication information is used to indicate the global path; and determine the road-level global path from the start location to the destination according to the first indication information.

Optionally, in another embodiment, the first determining module 901 is specifically configured to: receive a first travelling-in notification message sent by a second roadside navigation apparatus, where the first travelling-in notification message is used to indicate that the terminal navigation apparatus is about to enter a coverage area of the first roadside navigation apparatus, and the first travelling-in notification message carries information about the global path; and determine the road-level global path from the start location to the destination according to the first travelling-in notification message.

Optionally, in another embodiment, the first determining module 901 is specifically configured to: receive a local path request sent by the terminal navigation apparatus, where the local path request carries information about the global path; and determine the road-level global path from the start location to the destination according to the local path request.

Optionally, in an embodiment, the second determining module 902 is specifically configured to determine the local path according to the global path and a local path policy. The local path policy includes at least one of lane load balancing, frequent lane change avoidance, throughput first, or speed first.

Optionally, the roadside navigation apparatus further includes a second sending module and a first receiving module. The second sending module is configured to send a second travelling-in notification message to a third roadside navigation apparatus. The second travelling-in notification message is used to indicate that the terminal navigation apparatus is about to travel into a coverage area of the third roadside navigation apparatus. The first receiving module is configured to receive a travelling-in acknowledgement message that is sent by the third roadside navigation apparatus according to the second travelling-in notification message. The travelling-in acknowledgement message is used to indicate that the terminal navigation apparatus has travelled into the coverage area of the third roadside navigation apparatus.

Therefore, according to the roadside navigation apparatus in this embodiment of the present invention, a road-level global path from a start location to a destination is determined, a lane-level local path corresponding to at least a part of the global path is determined according to the global path, and second indication information used to indicate the local path is sent to the terminal navigation apparatus. Therefore, navigation precision is improved, and the roadside navigation apparatus can be applicable to a large-scale self-driving scenario. A global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 10:
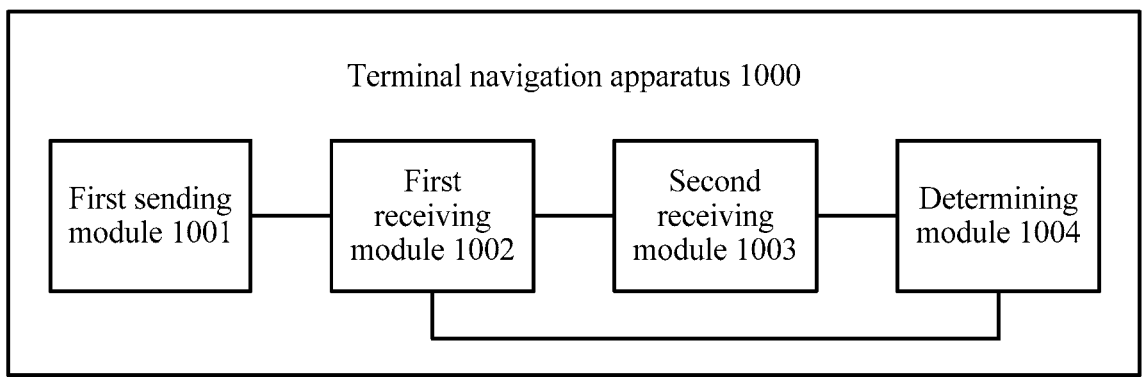
FIG. 10 is a schematic block diagram of a terminal navigation apparatus according to an embodiment of the present invention.

FIG. 10 is a schematic block diagram of a terminal navigation apparatus according to an embodiment of the present invention. As shown in FIG. 10, the terminal navigation apparatus 1000 includes:

a first sending module 1001, configured to send a global path request to a global navigation apparatus, where the global path request is used to request to determine a global path from a start location to a destination;

a first receiving module 1002, configured to receive first indication information that is sent by the global navigation apparatus according to the global path request sent by the first sending module 1001, where the first indication information is used to indicate a road-level global path from the start location to the destination;

a second receiving module 1003, configured to receive second indication information sent by a first roadside navigation apparatus, where the second indication information is used to indicate a lane-level local path corresponding to at least a part of the global path; and a determining module 1004, configured to determine a first travelling path according to at least one of the global path indicated by the first indication information received by the first receiving module 1002 or the local path indicated by the second indication information received by the second receiving module 1003.

Therefore, according to the terminal navigation apparatus in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, lane-level path planning and navigation are implemented, navigation precision is improved, and burden on the global navigation apparatus is not increased.

Optionally, in an embodiment, the first sending module 1001 is specifically configured to send the global path request to the first roadside navigation apparatus, so that the first roadside navigation apparatus forwards the global path request to the global navigation apparatus. The first receiving module 1002 is specifically configured to receive the first indication information forwarded by the first roadside navigation apparatus. The first indication information is sent by the global navigation apparatus to the first roadside navigation apparatus according to the global path request.

Optionally, the global path request carries additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the terminal navigation apparatus further includes a second sending module. The second sending module is configured to send a local path request to the first roadside navigation apparatus before the second receiving module receives the second indication information sent by the first roadside navigation apparatus. The local path request is used to request to determine the local path corresponding to the global path. The second receiving module 1003 is specifically configured to receive the second indication information that is sent by the first roadside navigation apparatus according to the local plan request.

Optionally, the terminal navigation apparatus further includes a third sending module and a third receiving module. The third sending module is configured to send a terminal registration request to the global navigation apparatus before the first sending module sends the global path request to the global navigation apparatus. The terminal registration request is used to request the global navigation apparatus to authenticate the terminal navigation apparatus. The third receiving module is configured to receive a terminal registration acknowledgement that is sent by the global navigation apparatus according to the terminal registration request.

Therefore, according to the terminal navigation apparatus in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, navigation precision is improved, and the terminal navigation apparatus can be applicable to a large-scale self-driving scenario. The global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 11:
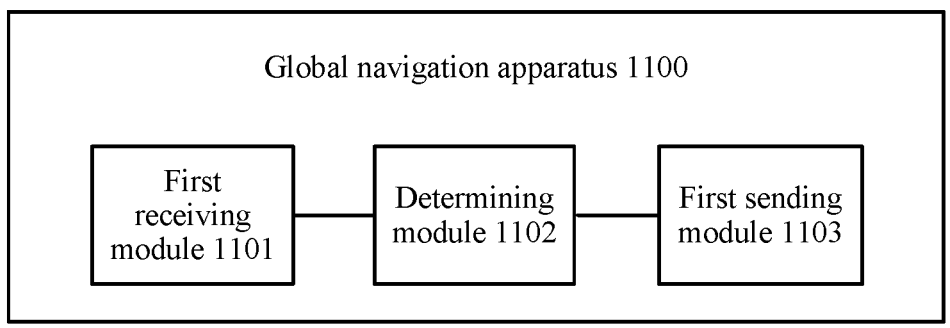
FIG. 11 is a schematic block diagram of a global navigation apparatus according to an embodiment of the present invention.

FIG. 11 is a schematic block diagram of a global navigation apparatus according to an embodiment of the present invention. As shown in FIG. 11, the global navigation apparatus 1100 includes:

a first receiving module 1101, configured to receive a global path request sent by a terminal navigation apparatus, where the global path request is used to request to determine a global path from a start location to a destination;

a determining module 1102, configured to determine a road-level global path from the start location to the destination according to the global path request received by the first receiving module 1101; and a first sending module 1103, configured to send first indication information to a first roadside navigation apparatus corresponding to the terminal navigation apparatus, where the first indication information is used to indicate the global path determined by the determining module 1102, so that the first roadside navigation apparatus determines, according to the first indication information, a lane-level local path corresponding to at least a part of the global path.

Therefore, according to the global navigation apparatus in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, lane-level path planning and navigation are implemented, navigation precision is improved, and burden on the global navigation apparatus is not increased.

Optionally, in an embodiment, the first receiving module 1101 is specifically configured to receive the global path request forwarded by the first roadside navigation apparatus. The global path request forwarded by the first roadside navigation apparatus is sent by the terminal navigation apparatus.

Optionally, in an embodiment, the determining module 1102 is specifically configured to determine the road-level global path from the start location to the destination according to the start location, the destination, and additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the global navigation apparatus further includes a second receiving module and a second sending module. The second receiving module is configured to receive a terminal registration request sent by the terminal navigation apparatus. The terminal registration request is used to request the global navigation apparatus to authenticate the terminal navigation apparatus. The second sending module is configured to send a terminal registration acknowledgement to the terminal navigation apparatus according to the terminal registration request.

Therefore, according to the global navigation apparatus in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, navigation precision is improved, and the global navigation apparatus can be applicable to a large-scale self-driving scenario. The global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 12:
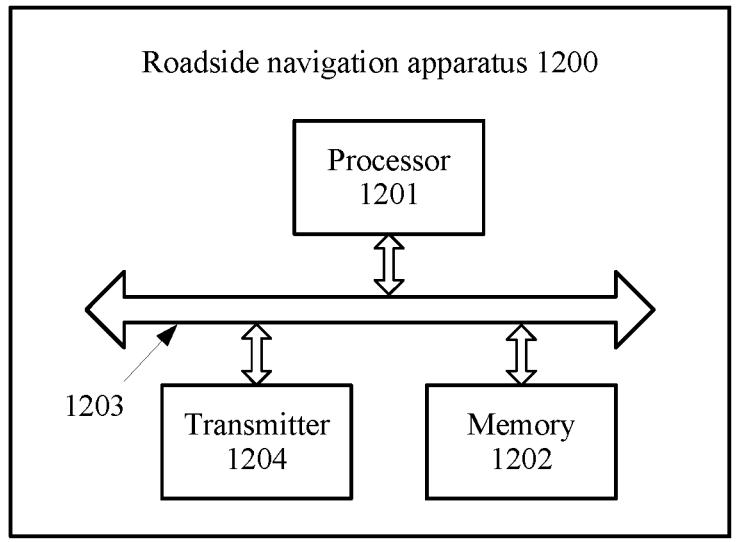
FIG. 12 is a schematic block diagram of a roadside navigation apparatus according to an embodiment of the present invention.

FIG. 12 is a schematic block diagram of a roadside navigation apparatus according to an embodiment of the present invention. As shown in FIG. 12, the roadside navigation apparatus 1200 includes a processor 1201, a memory 1202, a bus system 1203, and a transmitter 1204. The processor 1201, the memory 1202, and the transmitter 1204 are connected by using the bus system 1203. The memory 1202 is configured to store an instruction. The processor 1201 is configured to execute the instruction stored in the memory 1202.

The processor 1201 is configured to: determine a road-lane global path from a start location to a destination, and determine, according to the global path, a lane-level local path corresponding to at least a part of the global path.

The transmitter 1204 is configured to send second indication information to a terminal navigation apparatus. The second indication information is used to indicate the local path determined by the processor 1201.

Therefore, according to the roadside navigation apparatus in this embodiment of the present invention, a road-level global path from a start location to a destination is determined, a lane-level local path corresponding to at least a part of the global path is determined according to the global path, and second indication information used to indicate the local path is sent to the terminal navigation apparatus. Therefore, lane-level path planning and navigation are implemented, navigation precision is improved, and burden on a global navigation apparatus is not increased.

It should be understood that, in this embodiment of the present invention, the processor 1201 may be a central processing unit (Central Processing Unit, "CPU" for short), or the processor 1201 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any normal processor or the like.

The memory 1202 may include a read-only memory and a random access memory, and provide an instruction and data to the processor 1201.

In addition to a data bus, the bus system 1203 may include a power bus, a control bus, a status signal bus, and the like. However, for clear description, various types of buses in the figure are marked as the bus system 1203.

In an implementation process, the steps in the foregoing methods may be completed by using an integrated logic circuit of hardware in the processor 1201 or an instruction in a form of software. The steps of the methods disclosed with reference to the embodiments of the present invention may be directly performed by a hardware processor, or may be performed by using a combination of the hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1202. The processor 1201 reads information in the memory 1202, and completes the steps of the foregoing methods in combination with the hardware of the processor 1201. To avoid repetition, details are not described herein.

Optionally, in an embodiment, the processor 1201 is specifically configured to: receive first indication information sent by the global navigation apparatus, where the first indication information is used to indicate the global path; and determine the road-level global path from the start location to the destination according to the first indication information.

Optionally, in another embodiment, the processor 1201 is specifically configured to: receive a first travelling-in notification message sent by a second roadside navigation apparatus, where the first travelling-in notification message is used to indicate that the terminal navigation apparatus is about to enter a coverage area of the first roadside navigation apparatus, and the first travelling-in notification message carries information about the global path; and determine the road-level global path from the start location to the destination according to the first travelling-in notification message.

Optionally, in another embodiment, the processor 1201 is specifically configured to: receive a local path request sent by the terminal navigation apparatus, where the local path request carries information about the global path; and determine the road-level global path from the start location to the destination according to the local path request.

Optionally, in another embodiment, the processor 1201 is specifically configured to determine the local path according to the global path and a local path policy. The local path policy includes at least one of lane load balancing, frequent lane change avoidance, throughput first, or speed first.

Optionally, in an embodiment, the transmitter 1204 is further configured to send a second travelling-in notification message to a third roadside navigation apparatus. The second travelling-in notification message is used to indicate that the terminal navigation apparatus is about to travel into a coverage area of the third roadside navigation apparatus.

Optionally, the roadside navigation apparatus further includes a receiver. The receiver is configured to receive a travelling-in acknowledgement message that is sent by the third roadside navigation apparatus according to the second travelling-in notification message. The travelling-in acknowledgement message is used to indicate that the terminal navigation apparatus has travelled into the coverage area of the third roadside navigation apparatus.

Therefore, according to the roadside navigation apparatus in this embodiment of the present invention, a road-level global path from a start location to a destination is determined, a lane-level local path corresponding to at least a part of the global path is determined according to the global path, and second indication information used to indicate the local path is sent to the terminal navigation apparatus. Therefore, navigation precision is improved, and the roadside navigation apparatus can be applicable to a large-scale self-driving scenario. A global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 13:
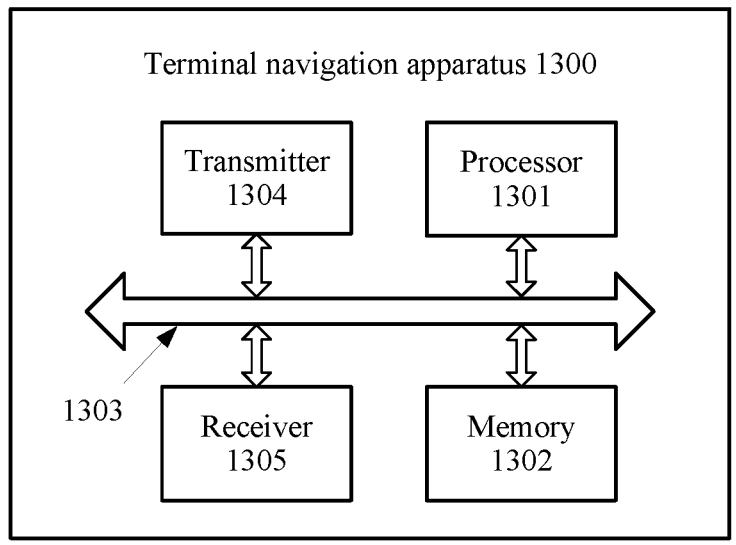
FIG. 13 is a schematic block diagram of a terminal navigation apparatus according to an embodiment of the present invention.

FIG. 13 is a schematic block diagram of a terminal navigation apparatus according to an embodiment of the present invention. The terminal navigation apparatus 1300 includes a processor 1301, a memory 1302, a bus system 1303, a transmitter 1304, and a receiver 1305. The processor 1301, the memory 1302, the transmitter 1304, and the receiver 1305 are connected by using the bus system 1303. The memory 1302 is configured to store an instruction. The processor 1301 is configured to execute the instruction stored in the memory 1302.

The transmitter 1304 is configured to send a global path request to a global navigation apparatus. The global path request is used to request to determine a global path from a start location to a destination.

The receiver 1305 is configured to: receive first indication information that is sent by the global navigation apparatus according to the global path request sent by the transmitter 1304, where the first indication information is used to indicate a road-level global path from the start location to the destination; and receive second indication information sent by a first roadside navigation apparatus, where the second indication information is used to indicate a lane-level local path corresponding to at least a part of the global path.

The processor 1301 is configured to determine a first travelling path according to at least one of the global path indicated by the first indication information received by the receiver 1305 or the local path indicated by the second indication information received by the receiver 1305.

Therefore, according to the terminal navigation apparatus in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, lane-level path planning and navigation are implemented, navigation precision is improved, and burden on the global navigation apparatus is not increased.

It should be understood that, in this embodiment of the present invention, the processor 1301 may be a central processing unit (Central Processing Unit, "CPU" for short), or the processor 1301 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any normal processor or the like.

The memory 1302 may include a read-only memory and a random access memory, and provide an instruction and data to the processor 1301.

In addition to a data bus, the bus system 1303 may include a power bus, a control bus, a status signal bus, and the like. However, for clear description, various types of buses in the figure are marked as the bus system 1303.

In an implementation process, the steps in the foregoing methods may be completed by using an integrated logic circuit of hardware in the processor 1301 or an instruction in a form of software. The steps of the methods disclosed with reference to the embodiments of the present invention may be directly performed by a hardware processor, or may be performed by using a combination of the hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1302. The processor 1301 reads information in the memory 1302, and completes the steps of the foregoing methods in combination with the hardware of the processor 1301. To avoid repetition, details are not described herein.

Optionally, in an embodiment, the transmitter 1304 is specifically configured to send the global path request to the first roadside navigation apparatus, so that the first roadside navigation apparatus forwards the global path request to the global navigation apparatus. The receiver 1305 is specifically configured to receive the first indication information forwarded by the first roadside navigation apparatus. The first indication information is sent by the global navigation apparatus to the first roadside navigation apparatus according to the global path request.

Optionally, the global path request carries additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the transmitter 1304 is further configured to send a local path request to the first roadside navigation apparatus before the the receiver 1305 receives the second indication information sent by the first roadside navigation apparatus. The local path request is used to request to determine the local path corresponding to the global path. The receiver 1305 is further configured to receive the second indication information that is sent by the first roadside navigation apparatus according to the local plan request.

Therefore, according to the terminal navigation apparatus in this embodiment of the present invention, a global path request is sent to a global navigation apparatus; first indication information and second indication information are received, where the first indication information is sent by the global navigation apparatus according to the global path request and is used to indicate a road-level global path from a start location to a destination, and the second indication information is sent by a first roadside navigation apparatus and is used to indicate a lane-level local path corresponding to at least a part of the global path; and a travelling path is determined according to at least one of the first indication information or the second indication information. Therefore, navigation precision is improved, and the terminal navigation apparatus can be applicable to a large-scale self-driving scenario. The global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

Figure 14:
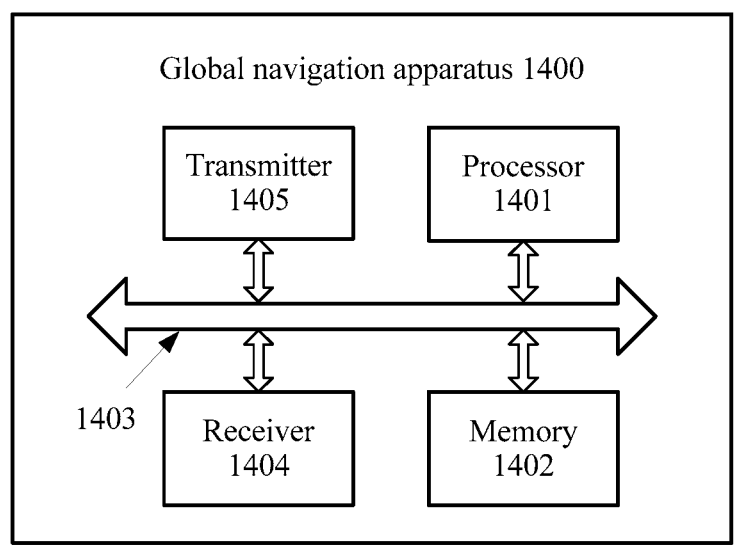
FIG. 14 is a schematic block diagram of a global navigation apparatus according to an embodiment of the present invention.

FIG. 14 is a schematic block diagram of a global navigation apparatus according to an embodiment of the present invention. The global navigation apparatus 1400 includes a processor 1401, a memory 1402, a bus system 1403, a receiver 1404, and a transmitter 1405. The processor 1401, the memory 1402, the receiver 1404, and the transmitter 1405 are connected by using the bus system 1403. The memory 1402 is configured to store an instruction. The processor 1401 is configured to execute the instruction stored in the memory 1402.

The receiver 1404 is configured to receive a global path request sent by a terminal navigation apparatus. The global path request is used to request to determine a global path from a start location to a destination.

The processor 1401 is configured to determine a road-level global path from the start location to the destination according to the global path request received by the receiver 1404.

The transmitter 1405 is configured to send first indication information to a first roadside navigation apparatus corresponding to the terminal navigation apparatus. The first indication information is used to indicate the global path determined by the processor 1401, so that the first roadside navigation apparatus determines, according to the first indication information, a lane-level local path corresponding to at least a part of the global path.

Therefore, according to the global navigation apparatus in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, lane-level path planning and navigation in an entire journey are implemented, and navigation precision is improved.

It should be understood that, in this embodiment of the present invention, the processor 1401 may be a central processing unit (Central Processing Unit, "CPU" for short), or the processor 1401 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any normal processor or the like.

The memory 1402 may include a read-only memory and a random access memory, and provide an instruction and data to the processor 1401.

In addition to a data bus, the bus system 1403 may include a power bus, a control bus, a status signal bus, and the like. However, for clear description, various types of buses in the figure are marked as the bus system 1403.

In an implementation process, the steps in the foregoing methods may be completed by using an integrated logic circuit of hardware in the processor 1401 or an instruction in a form of software. The steps of the methods disclosed with reference to the embodiments of the present invention may be directly performed by a hardware processor, or may be performed by using a combination of the hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1402. The processor 1401 reads information in the memory 1402, and completes the steps of the foregoing methods in combination with the hardware of the processor 1401. To avoid repetition, details are not described herein.

Optionally, in an embodiment, the receiver 1404 is specifically configured to receive the global path request forwarded by the first roadside navigation apparatus. The global path request forwarded by the first roadside navigation apparatus is sent by the terminal navigation apparatus.

Optionally, in an embodiment, the processor 1401 is specifically configured to determine the road-level global path from the start location to the destination according to the start location, the destination, and additional information. The additional information includes at least one of the following information: current road condition information, global path policy information, vehicle type information of a vehicle corresponding to the terminal navigation apparatus, or driving type information of the vehicle. The driving type information is used to indicate whether a driving type of the vehicle is manned driving or unmanned driving. The vehicle type is used to indicate whether the vehicle is a common social vehicle, a bus, a school bus, or a vehicle such as 120/110/119 that executes an urgent task. The vehicle corresponding to the terminal navigation apparatus may be a vehicle in which the terminal navigation apparatus is located.

Optionally, the receiver 1404 is further configured to receive a terminal registration request sent by the terminal navigation apparatus. The terminal registration request is used to request the global navigation apparatus to authenticate the terminal navigation apparatus. The transmitter 1405 is further configured to send a terminal registration acknowledgement to the terminal navigation apparatus according to the terminal registration request.

Therefore, according to the global navigation apparatus in this embodiment of the present invention, a global path request sent by a terminal navigation apparatus is received, a road-level global path from the start location to the destination is determined according to the global path request, and first indication information used to indicate the global path is sent to a first roadside navigation apparatus corresponding to the terminal navigation apparatus, so that the first roadside navigation apparatus determines, according to the global path, a lane-level local path corresponding to at least a part of the global path. Therefore, navigation precision is improved, and the global navigation apparatus can be applicable to a large-scale self-driving scenario. The global navigation apparatus distributes massive lane-level path navigation services to multiple roadside navigation apparatuses, and a failure of a single roadside navigation apparatus does not cause breakdown of an entire system, so that system reliability is improved.

In a navigation system in this embodiment of the present invention, lane-level path planning and navigation in an entire journey are implemented, and burden on a global navigation apparatus is not increased. If lane-level path planning and navigation are implemented by a navigation system architecture of only two layers, that is, a global navigation apparatus and a terminal navigation apparatus, the global navigation apparatus is overburdened. Compared with the navigation system architecture of two layers, in a navigation system architecture of three layers in this embodiment of the present invention, burden of lane-level path planning is distributed to a roadside navigation apparatus, and the global navigation apparatus is only responsible for road-level path planning, so that the burden on the global navigation apparatus is reduced.

A person of ordinary skill in the art may be aware that, in combination with the examples described in the embodiments disclosed in this specification, apparatuses and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system and apparatus, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the apparatus division is merely logical function division and may be other division in actual implementation. For example, a plurality of apparatuses or components may be combined or integrated into another system, or some features may be ignored or not performed. In addition, the displayed or discussed mutual couplings or direct couplings or communication connections may be implemented through some interfaces, indirect couplings or communication connections between the apparatuses, or electrical connections, mechanical connections, or connections in other forms.

The apparatuses described as separate parts may or may not be physically separate, and parts displayed as apparatuses may or may not be physical apparatuses, may be located in one location, or may be distributed on a plurality of network apparatuses. Some or all of the apparatuses may be selected according to actual needs to achieve the objectives of the solutions of the embodiments.

In addition, functional apparatuses in the embodiments of the present invention may be integrated into one processing apparatus, or each of the apparatuses may exist alone physically, or two or more apparatuses are integrated into one apparatus.

When the functions are implemented in the form of a software functional apparatus and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A navigation system, comprising a global navigation apparatus, a first roadside navigation apparatus, and a terminal navigation apparatus; wherein
   the terminal navigation apparatus is configured to send a global path request to the global navigation apparatus, to determine a global path from a start location to a destination;
   the global navigation apparatus is configured to: receive the global path request sent by the terminal navigation apparatus, determine a road-level global path from the start location to the destination according to the global path request, and send first indication information to the first roadside navigation apparatus and the terminal navigation apparatus, wherein the first indication information indicates the global path;
   the first roadside navigation apparatus is configured to: determine, according to the first indication information, a lane-level local path corresponding to at least a part of the global path, and send, to the terminal navigation apparatus, second indication information indicating the lane-level local path; and
   the terminal navigation apparatus is further configured to: receive the first indication information sent by the global navigation apparatus and the second indication information sent by the first roadside navigation apparatus, and determine a first travelling path according to at least one of the global path indicated by the first indication information or the lane-level local path indicated by the second indication information.

2. The navigation system according to claim 1, wherein the global navigation apparatus is further configured to:
   receive the global path request sent by the terminal navigation apparatus;
   determine the global path according to the start location, the destination, and additional information, wherein the additional information comprises at least one of the following information: current road condition information, global path policy information, vehicle type information of a vehicle corresponding to the terminal navigation apparatus, or driving type information of the vehicle, and the driving type information indicates whether a driving type of the vehicle is manned driving or unmanned driving; and
   send the first indication information to the terminal navigation apparatus, wherein the first indication information indicates the global path.

3. The navigation system according to claim 1, wherein:
   the first roadside navigation apparatus is further configured to: receive the global path request sent by the terminal navigation apparatus, and forward the global path request to the global navigation apparatus;
   the global navigation apparatus is further configured to: receive the global path request forwarded by the first roadside navigation apparatus, and send the first indication information to the first roadside navigation apparatus according to the global path request;
   the first roadside navigation apparatus is further configured to: receive the first indication information sent by the global navigation apparatus, and forward the first indication information to the terminal navigation apparatus; and
   the terminal navigation apparatus is further configured to receive the first indication information forwarded by the first roadside navigation apparatus.

4. The navigation system according to claim 1, wherein:
   the first roadside navigation apparatus is further configured to: before determining, according to the global path, the lane-level local path corresponding to the at least a part of the global path, receive a local path request sent by the terminal navigation apparatus, wherein the local path request carries information about the global path; and
   the first roadside navigation apparatus is further configured to determine the global path according to the local path request.

5. The navigation system according to claim 1, wherein the navigation system further comprises a second roadside navigation apparatus;

the first roadside navigation apparatus is further configured to: before determining, according to the global path, the lane-level local path corresponding to the at least a part of the global path, receive a first travelling-in notification message sent by the second roadside navigation apparatus, wherein the first travelling-in notification message indicates that the terminal navigation apparatus is about to enter a coverage area of the first roadside navigation apparatus, and the first travelling-in notification message carries information about the global path; and the first roadside navigation apparatus is further configured to determine the global path according to the first travelling-in notification message.

6. The navigation system according to claim 1, wherein the first roadside navigation apparatus is further configured to determine the lane-level local path according to the global path and a local path policy, and the local path policy comprises at least one of lane load balancing, frequent lane change avoidance, throughput first, or speed first.

7. The navigation system according to claim 1, wherein the navigation system further comprises a third roadside navigation apparatus; and the first roadside navigation apparatus is further configured to:

send a second travelling-in notification message to the third roadside navigation apparatus, wherein the second travelling-in notification message indicates that the terminal navigation apparatus is about to travel into a coverage area of the third roadside navigation apparatus; and receive a travelling-in acknowledgement message sent by the third roadside navigation apparatus, wherein the travelling-in acknowledgement message indicates that the terminal navigation apparatus has travelled into the coverage area of the third roadside navigation apparatus.

8. A roadside navigation apparatus, comprising:

a first determining module, configured to determine a road-level global path from a start location to a destination;

a second determining module, configured to determine, according to the road-level global path determined by the first determining module, a lane-level local path corresponding to at least a part of the road-level global path; and a first sending module, configured to send second indication information to a terminal navigation apparatus, wherein the second indication information indicates the lane-level local path determined by the second determining module.

9. The roadside navigation apparatus according to claim 8, wherein the first determining module is configured to:

receive first indication information sent by a global navigation apparatus, wherein the first indication information indicates the road-level global path; and determine the road-level global path from the start location to the destination according to the first indication information.

10. The roadside navigation apparatus according to claim 8, wherein the first determining module is configured to:

receive a first travelling-in notification message sent by a second roadside navigation apparatus, wherein the first travelling-in notification message indicates that the terminal navigation apparatus is about to enter a coverage area of the roadside navigation apparatus, and the first travelling-in notification message carries information about the road-level global path; and determine the road-level global path from the start location to the destination according to the first travelling-in notification message.

11. The roadside navigation apparatus according to claim 8, wherein the roadside navigation apparatus further comprises:

a second sending module, configured to send a second travelling-in notification message to a third roadside navigation apparatus, wherein the second travelling-in notification message indicates that the terminal navigation apparatus is about to travel into a coverage area of the third roadside navigation apparatus; and a first receiving module, configured to receive a travelling-in acknowledgement message that is sent by the third roadside navigation apparatus according to the second travelling-in notification message, wherein the travelling-in acknowledgement message indicates that the terminal navigation apparatus has traveled into the coverage area of the third roadside navigation apparatus.

12. A terminal navigation apparatus, comprising:

a first sending module, configured to send a global path request to a global navigation apparatus to request the global navigation apparatus to determine a global path from a start location to a destination;

a first receiving module, configured to receive first indication information sent by the global navigation apparatus, wherein the first indication information indicates a road-level global path from the start location to the destination;

a second receiving module, configured to receive second indication information sent by a first roadside navigation apparatus, wherein the second indication information indicates a lane-level local path corresponding to at least a part of the global path; and a determining module, configured to determine a first travelling path according to at least one of the global path indicated by the first indication information received by the first receiving module or the lane-level local path indicated by the second indication information received by the second receiving module.

13. The terminal navigation apparatus according to claim 12, wherein the first sending module is configured to:

send the global path request to the first roadside navigation apparatus to request the first roadside navigation apparatus to forward the global path request to the global navigation apparatus; and the first receiving module is configured to:

receive the first indication information forwarded by the first roadside navigation apparatus, wherein the first indication information is sent by the global navigation apparatus to the first roadside navigation apparatus according to the global path request.

14. The terminal navigation apparatus according to claim 12, wherein the global path request carries additional information, the additional information comprises at least one of the following information: current road condition information, global path policy information, vehicle type information of a vehicle corresponding to the terminal navigation apparatus, or driving type information of the vehicle, and the driving type information indicates whether a driving type of the vehicle is manned driving or unmanned driving.

15. The terminal navigation apparatus according to claim 12, further comprising a second sending module;

the second sending module is configured to send a local path request to the first roadside navigation apparatus before the second receiving module receives the second indication information sent by the first roadside navigation apparatus to request the to the first roadside navigation apparatus to determine the lane-level local path corresponding to the global path; and the second receiving module is configured to:

receive the second indication information that is sent by the first roadside navigation apparatus according to the local path request.

16. A navigation method, comprising:

determining, by a first roadside navigation apparatus, a road-level global path from a start location to a destination;

determining, by the first roadside navigation apparatus according to the road-level global path, a lane-level local path corresponding to at least a part of the road-level global path; and sending, by the first roadside navigation apparatus, second indication information to a terminal navigation apparatus, wherein the second indication information indicates the lane-level local path.

17. The navigation method according to claim 16, wherein determining, by a first roadside navigation apparatus, a road-level global path from a start location to a destination comprises:

receiving a first travelling-in notification message sent by a second roadside navigation apparatus, wherein the first travelling-in notification message indicates that the terminal navigation apparatus is about to enter a coverage area of the first roadside navigation apparatus, and the first travelling-in notification message carries information about the road-level global path; and determining the road-level global path according to the first travelling-in notification message.

18. The navigation method according to claim 16, wherein the determining, by the first roadside navigation apparatus according to the road-level global path, a lane-level local path corresponding to at least a part of the road-level global path comprises:

determining the lane-level local path according to the road-level global path and a local path policy, wherein the local path policy comprises at least one of lane load balancing, frequent lane change avoidance, throughput first, or speed first.

19. A navigation method, comprising:

sending, by a terminal navigation apparatus, a global path request to a global navigation apparatus to request the global navigation apparatus to determine a global path from a start location to a destination;

determining, by the global navigation apparatus, the road-level global path according to the global path request;

sending, by the global navigation apparatus, first indication information to a first roadside navigation apparatus and the terminal navigation apparatus, wherein the first indication information indicates the global path;

determining, by the first roadside navigation apparatus, a lane-level local path corresponding to at least a part of the global path according to the first indication information;

receiving, by the terminal navigation apparatus, the first indication information from the global navigation apparatus;

receiving, by the terminal navigation apparatus, second indication information from the first roadside navigation apparatus, wherein the second indication information indicates the lane-level local path; and determining, by the terminal navigation apparatus, a first travelling path according to at least one of the global path indicated by the first indication information or the lane-level local path indicated by the second indication information.

20. The navigation method according to claim 19, wherein sending, by the terminal navigation apparatus, the global path request to the global navigation apparatus comprises:

sending, by the terminal navigation apparatus, the global path request to the first roadside navigation apparatus to request the first roadside navigation apparatus to forward the global path request to the global navigation apparatus.

21. The navigation method according to claim 19, wherein the global path request carries additional information, the additional information comprises at least one of the following information: current road condition information, global path policy information, vehicle type information of a vehicle corresponding to a terminal navigation apparatus, or driving type information of the vehicle, and the driving type information indicates whether a driving type of the vehicle is manned driving or unmanned driving.

22. The navigation method according to claim 19, further comprises:

sending, by the terminal navigation apparatus, a local path request to the first roadside navigation apparatus, wherein the local path request carries information about the global path; and receiving, by the terminal navigation apparatus, the second indication information from the first roadside navigation apparatus according to the local path request.

* * * * *